US005608639A

United States Patent [19]

[11] Patent Number: 5,608,639

Twardowski et al.

[45] Date of Patent: Mar. 4, 1997

[54] SYSTEM AND METHOD FOR PRINTING, ASSEMBLY AND VERIFYING A MULTIPLE-PART PRINTED PRODUCT

[75] Inventors: Joseph W. Twardowski, Schaumburg; Raymond J. Graham, Buffalo Grove; Scott A. Stevens, Downers Grove, all of Ill.

[73] Assignee: Wallace Computer Services, Inc., Hillside, Ill.

[21] Appl. No.: 372,671

[22] Filed: Jan. 13, 1995

[51] Int. Cl.[6] .......... G06F 19/00

[52] U.S. Cl. .......... 364/469.04; 364/469.03; 364/469.01

[58] Field of Search .......... 364/478, 471, 364/171; 156/250, 70; 355/207; 53/411; 271/3.1; 270/52

[56] References Cited

U.S. PATENT DOCUMENTS 4,574,692 3/1986 Wahli .......... 101/2
5,033,725 7/1991 van Duursen .......... 270/52
5,067,088 11/1991 Schneiderhan .......... 364/478

*Primary Examiner*—Roy N. Envall, Jr.
*Assistant Examiner*—Y. Kundupoglu
*Attorney, Agent, or Firm*—Roylance, Abrams, Berdo & Goodman, L.L.P.

[57] ABSTRACT

An automatic verification or matching system is provided for insuring that a multiple-part printed product, such as a multiple-ply form with matching variable indicia on each ply, has been properly assembled. The system operates in conjunction with a conventional pin band collator and comprises a plurality of indicia sensing devices, such as bar code scanners and/or video cameras, located at the collator stations for sensing the variable indicia on each part of the product during assembly. Advantages of the system include the ability to use either bar code scanners or video cameras as indicia sensing devices, provision for automatic resequencing of the printers used for printing the variable indicia in the event of a mismatch error, automatic indication of the collator station where a mismatch error has occurred, and automatic marking of defective products that are produced after an error occurs.

45 Claims, 19 Drawing Sheets

| | PHOTO EYE | | CAMERA 1 | | SCANNER 1 | | SCANNER 2 | | SCANNER 3 |
|---|---|---|---|---|---|---|---|---|---|
| P1> | INDEX 1<br>PTR->NEXT | C1> | INDEX 1<br>DATA: 380001<br>PTR->NEXT | | | | | | |
| | INDEX 2<br>PTR->NEXT | | INDEX 2<br>DATA: 380002<br>PTR->NEXT | | | | | | |
| | INDEX 3<br>PTR->NEXT | | INDEX 3<br>DATA: 380003<br>PTR->NEXT | | | | | | |
| | INDEX 4<br>PTR->NEXT | | INDEX 4<br>DATA: 380004<br>PTR->NEXT | | | | | | |
| | INDEX 5<br>PTR->NEXT | | INDEX 5<br>DATA: 380005<br>PTR->NEXT | S1> | INDEX 5<br>DATA: 380005<br>PTR->NEXT | | | | |
| | INDEX 6<br>PTR->NEXT | | INDEX 6<br>DATA: 380006<br>PTR->NEXT | | INDEX 6<br>DATA: 380006<br>PTR->NEXT | | | | |
| | INDEX 7<br>PTR->NEXT | | INDEX 7<br>DATA: 380007<br>PTR->NEXT | | INDEX 7<br>DATA: 380007<br>PTR->NEXT | | | | |
| | INDEX 8<br>PTR->NEXT | | INDEX 8<br>DATA: 380008<br>PTR->NEXT | | INDEX 8<br>DATA: 380008<br>PTR->NEXT | | | | |
| | INDEX 9<br>PTR->NEXT | | INDEX 9<br>DATA: 380009<br>PTR->NEXT | | INDEX 9<br>DATA: 380009<br>PTR->NEXT | S2> | INDEX 9<br>DATA: 380009<br>PTR->NEXT | | |
| | INDEX 10<br>PTR->NEXT | | INDEX 10<br>DATA: 380010<br>PTR->NEXT | | INDEX 10<br>DATA: 380010<br>PTR->NEXT | | INDEX 10<br>DATA: 380010<br>PTR->NEXT | | |
| | INDEX 11<br>PTR->NEXT | | INDEX 11<br>DATA: 380011<br>PTR->NEXT | | INDEX 11<br>DATA: 380011<br>PTR->NEXT | | INDEX 11<br>DATA: 380011<br>PTR->NEXT | | |
| | INDEX 12<br>PTR->NEXT | | INDEX 12<br>DATA: 380012<br>PTR->NEXT | | INDEX 12<br>DATA: 380012<br>PTR->NEXT | | INDEX 12<br>DATA: 380012<br>PTR->NEXT | | |
| | INDEX 13<br>PTR->NEXT | | INDEX 13<br>DATA: 380013<br>PTR->NEXT | | INDEX 13<br>DATA: 380013<br>PTR->NEXT | | INDEX 13<br>DATA: 380013<br>PTR->NEXT | S3> | INDEX 13<br>DATA: 380013<br>PTR->NEXT |
| | INDEX 14<br>PTR->NEXT | | INDEX 14<br>DATA: 380014<br>PTR->NEXT | | INDEX 14<br>DATA: 380014<br>PTR->NEXT | | INDEX 14<br>DATA: 380014<br>PTR->NEXT | | INDEX 14<br>DATA: 380014<br>PTR->NEXT |
| | INDEX 15<br>PTR->NEXT | | INDEX 15<br>DATA: 380015<br>PTR->NEXT | | INDEX 15<br>DATA: 380015<br>PTR->NEXT | | INDEX 15<br>DATA: 380015<br>PTR->NEXT | | INDEX 15<br>DATA: 380015<br>PTR->NEXT |
| | INDEX 16<br>PTR->NEXT | | INDEX 16<br>DATA: 380016<br>PTR->NEXT | | INDEX 16<br>DATA: 380016<br>PTR->NEXT | | INDEX 16<br>DATA: 380016<br>PTR->NEXT | | INDEX 16<br>DATA: 380016<br>PTR->NEXT |

*FIG. 12A*

| | | | | |
|---|---|---|---|---|
| INDEX 17<br>PTR -> NEXT | INDEX 17<br>DATA: 380017<br>PTR -> NEXT | INDEX 17<br>DATA: 380017<br>PTR -> NEXT | INDEX 17<br>DATA: 380017<br>PTR -> NEXT | INDEX 17<br>DATA: 380017<br>PTR -> NEXT |
| INDEX 18<br>PTR -> NEXT | INDEX 18<br>DATA: 380018<br>PTR -> NEXT | INDEX 18<br>DATA: 380018<br>PTR -> NEXT | INDEX 18<br>DATA: 380018<br>PTR -> NEXT | INDEX 18<br>DATA: 380018<br>PTR -> NEXT |
| INDEX 19<br>PTR -> NEXT | INDEX 19<br>DATA: 380019<br>PTR -> NEXT | INDEX 19<br>DATA: 380019<br>PTR -> NEXT | INDEX 19<br>DATA: 380019<br>PTR -> NEXT | INDEX 19<br>DATA: 380019<br>PTR -> NEXT |
| INDEX 20<br>PTR -> NEXT | INDEX 20<br>DATA: 380020<br>PTR -> NEXT | INDEX 20<br>DATA: 380020<br>PTR -> NEXT | INDEX 20<br>DATA: 380020<br>PTR -> NEXT | INDEX 20<br>DATA: 380020<br>PTR -> NEXT |
| | | | | |
| INDEX 255<br>PTR -> NEXT | INDEX 255<br>DATA: 380255<br>PTR -> NEXT | INDEX 255<br>DATA: 380255<br>PTR -> NEXT | INDEX 255<br>DATA: 380255<br>PTR -> NEXT | INDEX 255<br>DATA: 380255<br>PTR -> NEXT |
| INDEX 256<br>PTR -> FIRST | INDEX 256<br>DATA: 380256<br>PTR -> FIRST | INDEX 256<br>DATA: 380256<br>PTR -> FIRST | INDEX 256<br>DATA: 380256<br>PTR -> FIRST | INDEX 256<br>DATA: 380256<br>PTR -> FIRST |

*FIG. 12B*

SYSTEM AND METHOD FOR PRINTING, ASSEMBLY AND VERIFYING A MULTIPLE-PART PRINTED PRODUCT

FIELD OF THE INVENTION

The present invention relates generally to automatic verification or matching systems for multiple-part printed products, and is particularly concerned with a ply matching system which ensures that a multiple-ply form has been properly assembled.

BACKGROUND OF THE INVENTION

In the manufacture of multiple-part printed products containing information that varies from one product to the next, such as express shipping waybills and direct mail solicitations, it is necessary to ensure that all of the parts of each product match before the products are put into use. An express shipping waybill, for example, typically consists of a multiple-ply form with a tracking number printed in human readable or bar code form, or both, on each ply. The tracking number changes from form to form, but is the same on all plies of a given form. If the tracking numbers on all plies of a given form do not match due to an error in assembling the form, it may be difficult or impossible to track a lost shipment. Similarly, a direct mail solicitation typically consists of several parts, including a letter to the recipient, an order or application form that is intended to be returned by the recipient, and an envelope in which these items are enclosed. All of these parts will ordinarily be printed with the recipient's name and address, and possibly with other information that is unique to the recipient, and hence it is important to be sure that all parts intended for the same recipient are properly matched before the direct mail solicitation is sent. If this does not occur, the solicitation may have little or no value to the sender.

Multiple-ply shipping waybills and other types of multiple-ply forms are usually manufactured in a two-step process. In the first step, continuous webs or strips, one for each ply of the resulting form, are printed with the fixed information which does not vary from one form to the next. This information will typically consist of instructions for using the form, an arrangement of blocks or spaces in which information concerning the shipment is inserted, and the shipping company's name and logo. In the second step, rolls of the printed webs are mounted on a pin band collator for assembly into forms. In the collator, the individual webs are overlaid and adhesively bonded to each other to form a continuous strip of connected, multiple-ply forms which are then cut or perforated to produce individual forms. The required variable information (i.e., tracking numbers) can be printed on the individual plies of each form in two different ways. In one way, a mechanical numbering head or other type of variable printer is mounted on the printing press that is used for printing the fixed information on the continuous webs, so that the fixed and variable information is printed at essentially the same time. In another technique, the variable information is applied to the continuous webs as they are being unwound from the pre-printed rolls and fed to the collator, so that printing of the variable information and collating of the webs takes place in one continuous operation. In both methods, proper assembly of the printed forms requires that accurate registration be maintained among the various webs that are fed to the collator.

In the past, the function of maintaining proper web registration on a collator was carried out manually by a human operator. In the case of webs pre-printed with the desired variable information, the operator was required to perform initial registration of the webs when the pre-printed rolls were mounted on the collator, and to visually monitor the operation of the collator to ensure that registration was not lost due to a feed error or other malfunction. A loss of registration generally required that the collator be stopped and that one or more of the webs be repositioned to restore proper registration. For webs that were printed with the desired variable information as they were being fed to the collator, restoration of proper registration also required that the printing devices themselves be stopped and resynchronized.

For a number of reasons, reliance on manual methods for monitoring and restoring registration among multiple webs or plies in a collating machine is undesirable. For example, a human operator will not necessarily be able to detect and correct a registration error as soon as it occurs, particularly at high web speeds. Consequently, the error may persist for an undesirably long period of time and may result in a large volume of wasted product. Moreover, once a registration error is discovered, manual restoration of proper registration generally requires that the operation of the collator be stopped. This reduces product throughput and, if the collator is so equipped, can also cause clogging of the adhesive spray nozzles that are used to secure the plies of a form to each other. An additional problem with manual methods arises when the variable information that has been printed on the plies of the form consists in whole or in part of bar codes or other machine-readable indicia, since it can be difficult for a human operator to visually match these codes without a high degree of training or experience.

A number of systems have been proposed in which video cameras are used to automatically check for proper matching between different parts of a printed product, such as different personalized components of a mass mail item. These systems allow matching errors to be detected very quickly. However, video cameras must be triggered at precisely the right time in order to capture the desired image within the frame or field of view of the camera, and this imposes strict timing and synchronization requirements if the system is to operate properly. In known systems employing intermittently moving transport mechanisms, the fixed cycle time of the transport mechanism provides a reference that enables the video cameras to be triggered at the proper moment. However, the collators used to assemble multiple-ply forms generally operate continuously rather than intermittently, and hence time-based synchronization techniques are not practical in this situation. In one known type of video camera verification system designed for use with a continuously moving transport system, an encoder is used to synchronize the video cameras with the movement of the transport system. In this system, the encoder must turn one revolution for each form length or multiple thereof. Thus, if the form length changes, the gearing on the encoder must also change. Similarly, if a web break requires that the web be removed from the transport system and then replaced at a slightly different registration position, the video camera trigger points must be reprogrammed to correspond with the new form position. A further problem with this system is that, lacking any direct knowledge of the web position except by reference to the encoder output, the video cameras may be triggered at the wrong times if the web does not move in exact synchronism with the transport system. This would not ordinarily be a problem in a pin band collator, since the engagement of the pin bands with the webs provides the necessary synchronous motion, but it may occur in printing presses and other systems where there is no direct engagement between the transport mechanism and the web or sheet being processed. In the latter situation, paper stretching and web slippage may result in accumulating registration errors, and this may cause improper triggering of the video cameras used for verification or matching.

Video cameras are a useful type of scanning device in that they are capable of sensing virtually any type of visible indicia, including alphanumeric characters. However, in cases where the information to be matched consists of bar codes or other machine-readable indicia, the use of other, more specialized types of scanners or detectors is often preferable. For example, although a video camera is capable of detecting and decoding a printed bar code if appropriate software is provided, a dedicated laser bar code scanner can do so much more quickly and reliably, at lower cost, and with reduced set-up time. A bar code scanner is also capable of scanning a printed bar code at higher web speeds than a video camera, because of the time required to process the image data received from a video camera. Although it is possible to design a verification or matching system for use with bar code scanners rather than video cameras, this does not provide the user with the option to select either type of imaging device depending on the type of codes or indicia to be scanned at any given time. Bar code scanners and video cameras have different types of triggering and timing requirements, and a simple substitution of one type of device for the other is generally not possible.

Other drawbacks also exist with known types of automatic verification or matching systems. For example, known systems are generally designed to stop the motion of the product conveyor or transport mechanism when a mismatch is detected, in order to allow the error to be corrected manually. Although manual intervention may be desirable in some circumstances, there are other situations (particularly where a continuously operating collator with adhesive-applying stations is being used) in which it would be preferable to correct the registration error without stopping the conveyor or transport mechanism. Existing matching systems are also disadvantageous in that the source of a registration error is not always immediately apparent when the conveyor stops. This requires the operator to visually inspect the various feed stations to determine which station is supplying the part of the multiple-part product that does not match the others, so that the appropriate correction can be made. Ideally, it would be desirable to designate the source or cause of the registration error automatically, in order to reduce down time and operator workload. Another disadvantage of known matching systems is that it is not always possible to separate mismatched products from unaffected products after an error has occurred, and hence it is sometimes necessary to discard both in order to be sure that no defective products are inadvertently sold or put into use.

SUMMARY OF THE INVENTION

In accordance with an embodiment of the present invention, the foregoing disadvantages and limitations of the prior art are largely avoided by providing an automatic verification or matching system which is suitable for use with a continuously moving transport system, without requiring regearing for different repeat lengths or reprogramming following a web break. An embodiment of the invention also allows the user to employ either video cameras or bar code scanners, or both, with a minimal amount of set-up or modification. Embodiments of the present invention also provide for automatic resequencing in the event of a mismatch without stopping the product conveyor or transport mechanism, automatic indication of the source of a matching or registration error, and automatic marking of defective products that are produced after a registration error occurs.

In one aspect, therefore, the present invention is directed to an automatic verification system for use on a collator having a plurality of stations for assembling a multiple-part printed product and a continuously moving transport system for successively advancing the parts of the product through the stations. The verification system includes a plurality of indicia sensing devices which are associated with the plurality of stations, with each indicia sensing device being located at a different station for sensing indicia on a different part of the product and producing an output representing the sensed indicia. The system also includes a reference position sensor for sensing the arrival of a product or part thereof at a reference position on the collator and for producing an output in response to the arrival of the product or part at the reference position. A motion sensor is connected to the reference position sensor for sensing the movement of the transport system, and for producing outputs when the product or part has advanced by predetermined distances from the reference position. A control device is connected to the plurality of indicia sensing devices, to the reference position sensor, and to the motion sensor. The control device is operable to cause the indicia sensing devices to sense the indicia in response to outputs from the motion sensor, to store the outputs from the indicia sensing devices until the indicia for all parts of an assembled product have been sensed, and to compare the indicia to determine whether the product has been properly assembled. By virtue of the reference position sensor and motion sensor, the indicia sensing devices are properly synchronized to the movement of the product and parts thereof through the successive stations, without requiring regearing when the product repeat length changes or reprogramming when a web break occurs.

In another aspect, the present invention is directed to an automatic verification system for use on a collator having a plurality of stations for assembling a multiple-part printed product and a transport system for successively advancing the parts of the product through the stations. The verification system comprises a plurality of indicia sensing devices associated with the stations for sensing indicia on parts of the product and for producing outputs representing the sensed indicia. The indicia sensing devices include first and second indicia sensing devices of different types, such as a laser bar code scanner and a video camera. A control device is connected to the plurality of indicia sensing devices and is operable to cause the indicia sensing devices to sense the indicia, to store the outputs from the indicia sensing devices until the indicia for all parts of an assembled product have been sensed, and to compare the indicia to determine whether the product has been properly assembled. The control device produces a first output signal different from the first output signal for controlling the bar code scanner and a second output signal for controlling the video camera, thereby allowing both types of indicia sensing devices to be used in the same system.

In another aspect, the present invention is directed to an automatic verification system for use with a product printing and collating system which comprises a plurality of printing devices for printing variable indicia on different parts of a multiple-part printed product, and a collator for assembling the printed parts into a product. The collator includes a corresponding plurality of stations for receiving the printed parts from the printing devices and assembling the parts into a multiple-part printed product, and a transport system for advancing the parts of the product through the stations. The verification system comprises a plurality of indicia sensing devices associated with the plurality of stations, with each of the indicia sensing devices being located at a different station for sensing indicia on a different part of the product and producing an output representing the indicia. A control device is connected to the plurality of indicia sensing devices and to the plurality of printing devices. The control device is operable to cause the indicia sensing devices to sense the indicia, to store the outputs from the indicia sensing devices until the indicia for all parts of an assembled product has been sensed, and to compare the indicia to determine whether the product has been properly assembled. The control device is also operable to modify the operation of at least one of the printing devices in the event that the comparison operation indicates that the product has not been properly assembled. In this way, a matching or registration error can be corrected automatically and without stopping the operation of the printing and collating system.

In a further aspect, the present invention is directed to an automatic verification system for use on a collator having a plurality of stations for assembling a multiple-part printed product and a transport system for advancing the parts of the product through the stations. The verification system comprises a plurality of indicia sensing devices associated with the plurality of stations, with each of the indicia sensing devices being located at a different station for sensing indicia on a different part of the product and for producing an output representing the indicia. A control device is connected to the plurality of indicia sensing devices and is operable to cause the indicia sensing devices to sense the indicia, to store the outputs from the indicia sensing devices until the indicia for all parts of an assembled product have been sensed, and to compare the indica to determine whether the product has been properly assembled. A plurality of visual indicators is connected to the control device, with each indicator being located at a corresponding one of the stations for indicating an error condition occurring at the station. The error condition may comprise a matching error, out-of-sequence indicia, duplicate indicia, missing indicia or poor quality indicia. By locating the visual indicators at the individual collator stations, the source of an error condition is immediately identified so that it can be corrected without delay.

In a still further aspect, the present invention is directed to an automatic verification system for use on a collator having a plurality of stations for assembling a multiple-part printed product and a transport system for advancing the parts of the product through the stations. The verification system comprises a plurality of imaging devices associated with the plurality of stations, with each of the imaging devices being located at a different one of the stations for sensing indicia on a different part of the product and for producing an output representing the indicia. A control device is connected to the plurality of imaging devices and is operable to cause the imaging devices to sense the indicia, to store the outputs from the imaging devices until the indicia for all parts of an assembled products have been senses, to compare the indicia to determine whether the product has been properly assembled, and to produce an output signal in the event that a product has not been properly assembled. A dye marker activated by the output signal from the control device is mounted at an output end of the collator for marking a product which has been improperly assembled. The dye marker allows defective products to be immediately identified and discarded, and avoids the need to discard products which do not in fact contain assembly errors.

The present invention is also directed to methods for verifying proper assembly of a multiple-part printed product and methods for printing and assembling a multiple-part printed product. These methods may be carried out using the exemplary apparatus disclosed and claimed herein.

The term "indicia" is used herein to refer to all forms of optical or non-optical markings or codes which can be scanned or detected in order to verify proper matching between the parts of a multiple-part product, including bar codes, human readable characters, magnetic image character recognition (MICR) digits, magnetic strips, radio frequency (RF) devices, and the like.

BRIEF DESCRIPTION OF THE DRAWINGS

The various advantages and novel features of the present invention will be more readily apprehended from the following detailed description when read in conjunction with the appended drawings, in which:

FIG. 12 is a diagrammatic illustration of the recirculating FIFO buffers which are maintained in the memory of the computer to store output data from the bar code scanners and video cameras used in the automatic verification or matching system;

Throughout the drawings, like reference numerals will be understood to refer to like parts and components.

DETAILED DESCRIPTION OF THE PREFERRED EMBODIMENTS

Figure 1:
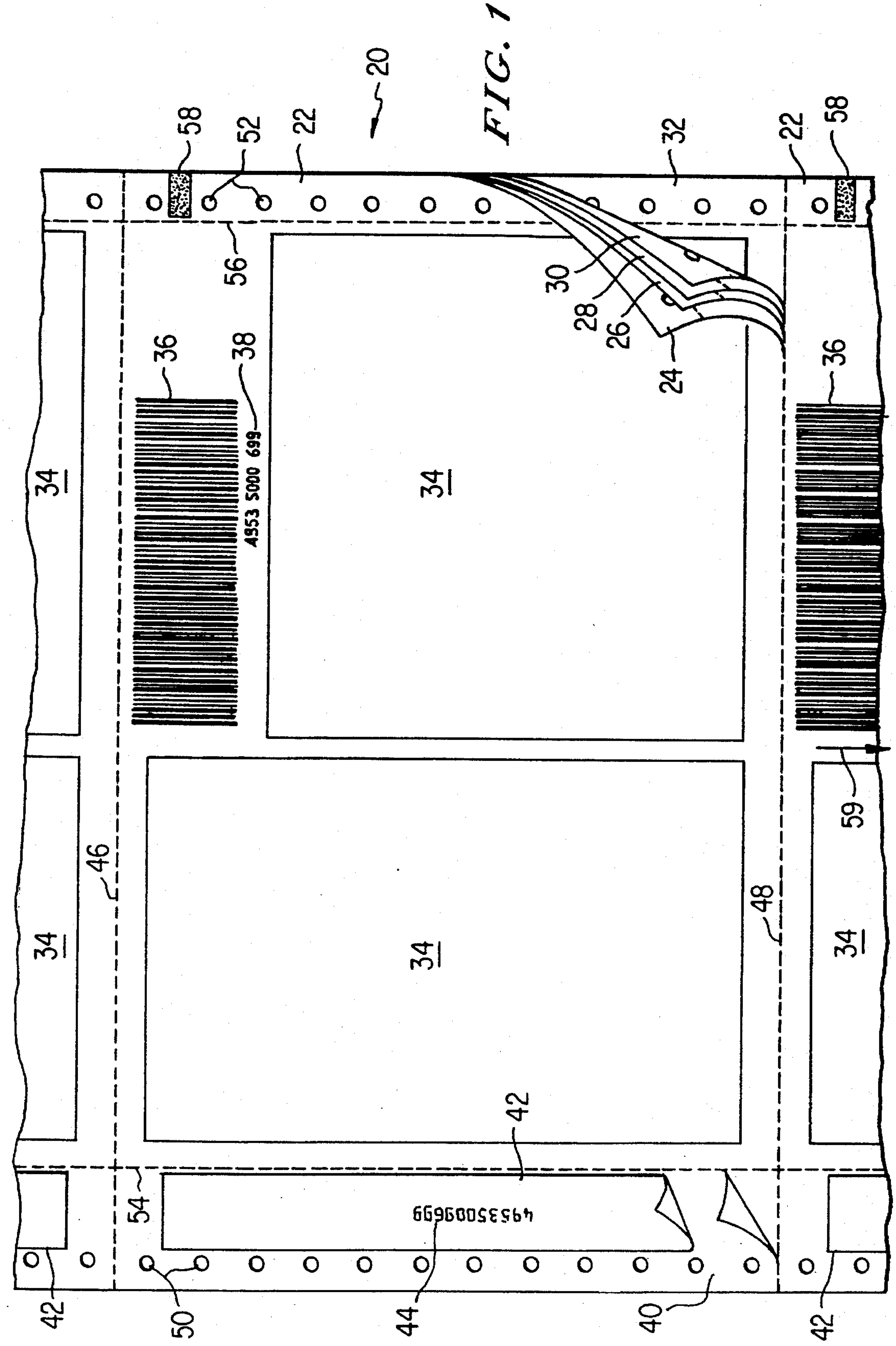
FIG. 1 illustrates a portion of a multiple-ply form strip which may be assembled with the aid of an automatic verification or matching system of the type contemplated by the present invention.

FIG. 1 illustrates a portion of a connected strip 20 of multiple-ply shipping waybill forms 22 which may be assembled with the aid of an automatic verification or matching system of the type contemplated by the present invention. Each form 22 comprises five main paper plies or layers 24, 26, 28, 30 and 32 which are overlaid on each other and held together by alternating lines of adhesive (not shown) located at or near the left-hand edge of the form 22. The top ply 24, whose printed layout is similar to that of the remaining plies, contains a number of pre-printed blocks or spaces 34 which contain instructions for the user of the form 22 and space for the insertion of information concerning the desired shipment. Each ply is also printed with a tracking number that is unique to each individual form 22 for allowing a lost or delayed shipment to be tracked by the shipping company. In the illustrated embodiment, the tracking number appears as a bar code 36 in the upper right-hand area of the top ply 24, and the same number appears in the form of human-readable digits 38 located just below the bar code 36. It will be understood that each of the remaining plies 26, 28, 30 and 32 contains the same bar code 36 and human-readable digits 38 at the same locations. Thus, when the plies 24–32 are detached from each other during the various stages of a shipment, the tracking number on any given ply will allow the status of the shipment to be monitored.

In addition to the five main plies 24–32, each form 22 includes a sixth ply in the form of a narrow, wax-coated strip 40 that is secured by means of an adhesive along the left-hand edge of the form. The strip 40 serves as a release layer for carrying a pressure-sensitive label 42. The label 42 is imprinted in human-readable digits 44 with the same tracking number represented by the bar code 36 and digits 38. The label 42 is provided for the purpose of allowing a record to be kept of a shipment represented by the form 22 without manually transcribing the tracking number or removing one of the main plies 24–32. For example, delivery personnel can confirm that a shipment has been delivered by peeling off the label 42 and securing it to a delivery list.

The strip 20 in FIG. 1 is separated into individual forms 22 by means of transverse lines of perforations 46 and 48. The strip is also provided with two longitudinal rows of punched holes 50 and 52, one along each lateral edge of the strip, for allowing the plies 24–32 of the strip 20 to be advanced by a standard pin band collator as will be described shortly. The holes 50 and 52 also allow the strip 20 to be loaded into a form-feed printer after finished forms 22 have been produced, in order to print standard or recurring information in the blocks or spaces 34. Carbonless ink technology can be employed to allow information written or typed in the blocks or spaces 34 of the top ply 24 to be duplicated in the corresponding spaces of the lower plies 26–32, or intervening layers of carbon paper (not shown) can be used for this purpose. In addition to the horizontal or transverse lines of perforations 46 and 48, longitudinal lines of perforations 54 and 56 are provided along the edges of the strip 20 to allow the main portions of the plies 24–32 to be separated from the edge portions containing the holes 50 and 52 and release strip 40. The perforations 46, 48, 54 and 56 are preferably formed through all of the plies 24–32 at once after the multiple-ply strip 20 has been assembled by a pin band collator. If individually cut and stacked forms 22 are desired, the transverse perforations 46 and 48 are replaced by cuts formed completely through the plies 24–32 of the strip 20. A registration mark 58, preferably consisting of a small rectangle printed in black ink at the right-hand edge of the top ply 24, is provided to indicate the position of each form 22 on the collator. The registration mark 58 is located at a known distance from the top or leading edge of the form (i.e., from the point where the line of perforations 46 will be formed) in the feed direction of the collator. In the illustrated embodiment, the feed direction is represented by the arrow 59 in FIG. 1.

Figure 2:
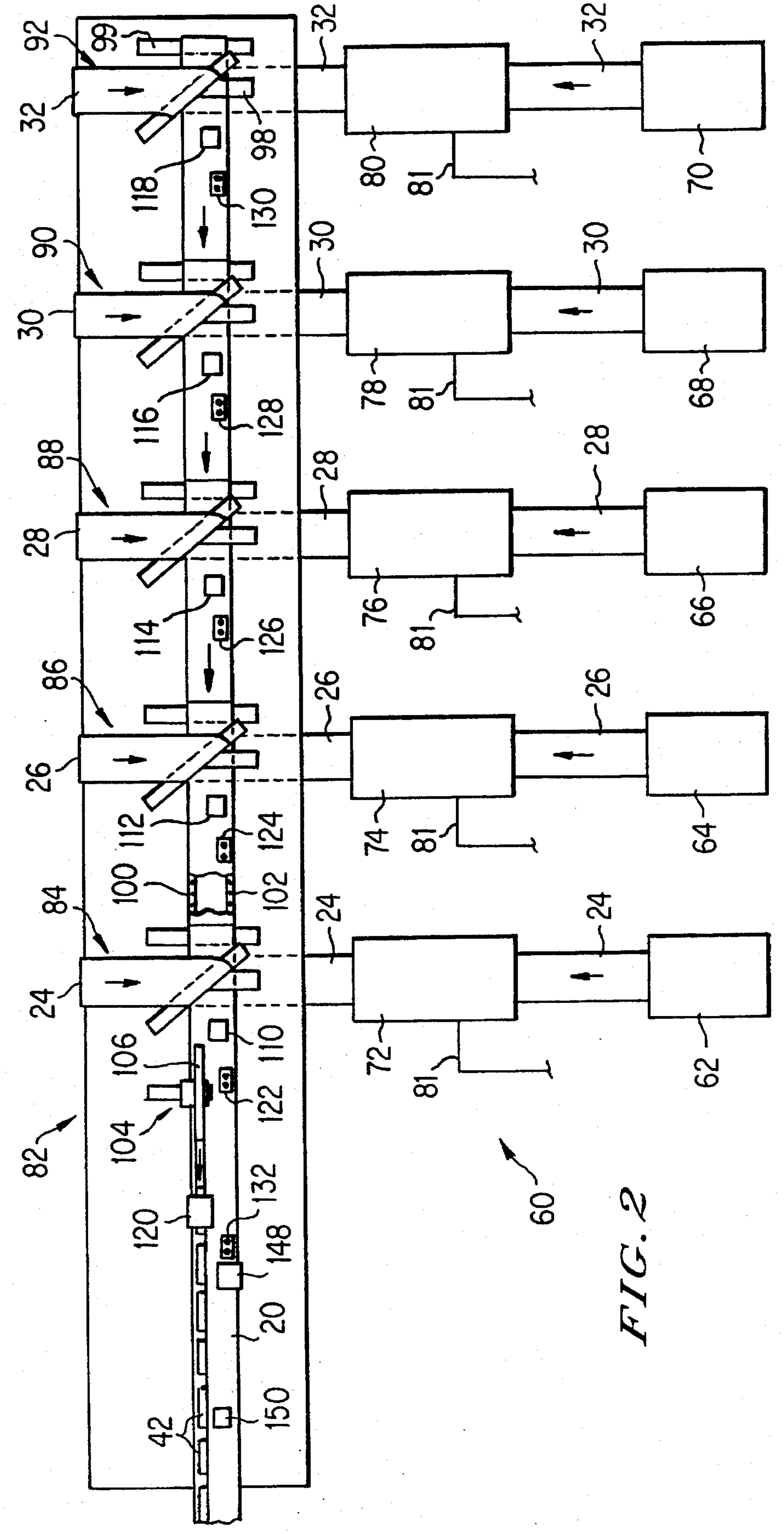
FIG. 2 is a diagrammatic overhead view of a printing and collating system fitted with an automatic verification or matching system in accordance with an embodiment of the present invention, for producing and verifying multiple-ply forms of the type illustrated in FIG. 1.

FIG. 2 is a diagrammatic overhead view of a printing and collating system 60 which may be used to produce multiple-ply forms 22 of the type illustrated in FIG. 1. The system 60 includes five unwind stands 62, 64, 66, 68 and 70, one for each of the plies 24, 26, 28, 30 and 32, respectively, of the assembled form 22. Each of the unwind stands 62–70 serves as a mounting fixture for dispensing the corresponding one of the plies 24–32 from a pre-printed roll (not shown). From the unwind stands 62–70, each of the plies 24, 26, 28, 30 and 32 is fed to a corresponding print engine 72, 74, 76, 78 and 80, respectively. The function of the print engines 72–80 is to apply the desired variable indicia (i.e., the bar code 36 and human-readable digits 38) to each of the plies 24–32 at the position shown in FIG. 1. Registration marks (not shown) similar to the registration mark 58 may be provided on each of the plies 24–32 for triggering the print engines 72–80 to print at the proper places on the respective plies. The print engines 72–80 may be of any desired type, but preferably comprise Series 400 or 700 Varypress magnetographic printers manufactured by Nipson Printing Systems of Belfort, France. These devices are controlled by digital inputs on lines 81 from external computers (not shown), and operate by forming latent magnetic images on a metal drum, developing the images with a toner composition, electrostatically transferring the developed toner images to the respective plies 24–32, and heat-fusing the toner images after transfer to the plies. Magnetographic printers have few moving parts and are reliable in operation, and hence they are well suited to high-volume variable printing applications. However, the print engines 72–80 may employ other types of printing technologies with which variable indicia can be printed, such as ion deposition printing, laser printing, ink jet printing and indexed mechanical printing. A suitable ion deposition printer, for example, is the Model 2460, X150 or Presidex 650 print engine manufactured by Delphax Systems of Mississagua, Ontario, Canada. The type of print engine selected will generally be determined by cost constraints and required image resolution, but other types of constraints (such as the need to avoid the pressure fusing step used in ion deposition printers when the plies 24–32 are coated with carbonless ink microcapsules) may require the use of one printing technology in lieu of another.

With continued reference to FIG. 2, the plies 24–32 which emerge from the print engines 72–80, respectively, have been printed with the desired variable information in the form of the bar code 36 and human-readable digits 38 shown in FIG. 1. In this condition, the plies 24–32 are fed to a pin band collator 82 which assembles the plies into a strip 20 of connected multiple-ply forms 22 of the type shown in FIG. 1 by overlaying the plies onto each other and securing them together at one edge with an adhesive. A diagrammatic side view of the collator 82 is provided in FIG. 3. For the most part, the collator 82 is conventional in construction and need not be described in detail. In general, the collator 82 comprises a series of stations 84, 86, 88, 90 and 92 which receive the individual plies 24, 26, 28, 30 and 32, respectively. Taking as an example the upstream station 92 (which receives the lowermost ply 32 from the unwind stand 70), the ply 32 is initially routed beneath the collator 82 and then travels vertically upward to emerge from a slot (not shown) in the side wall of the collator. From the slot, the ply 32 is turned 90° by a turn bar 96 so that it is aligned in the feed direction of the collator 82, and is then fed to the working surface of the collator 82 by means of guide and feed rollers 98 and 99. Additional rollers, which have not been shown for simplicity, assist in guiding the motion of the ply 32 through the collator 82. When the ply 32 reaches the working surface of the collator 82, it is in a face-up orientation (i.e., with the bar code 36 visible) and the holes 50 and 52 along each edge of the ply are engaged by the pin bands 100 and 102 of the collator. As is known, the pin bands 100 and 102 consist of endless metal strips with short, vertically projecting pins for engaging the plies to be assembled. Whenever the collator 82 is in operation, the pin bands 100 and 102 are driven continuously at a uniform velocity and serve as a transport system for conveying the plies 24–32 between successive stations 84–92 of the collator. At the upstream station 92, the lowermost ply 32 of the form 22 is engaged with the pin bands 100 and 102, and at the next station 90 the ply 30 is overlaid onto the ply 32 and engaged with the pin bands. An adhesive applying nozzle (not shown) located between the stations 90 and 92 applies a glue or adhesive to one edge of the lowermost ply 32 before it is overlaid by the next upper ply 30, so that the plies will remain attached once they are brought into contact. This series of events is repeated for each successive downstream station 88, 86 and 84, with the result that the remaining plies 28, 26 and 24 are successively overlaid and bonded to the previous plies to produce the finished multiple-ply strip 22 of FIG. 1.

In order to apply the release strip 40 and labels 42 of FIG. 1 to the combined plies 24–32, the collator 82 of FIG. 2 is provided with a sixth station 104 for dispensing the strip 40 and pre-printed labels 42 from a roll 106. Following application of the release strip 40 to the form strip 20 at the station 104, assembly of the multiple-ply forms 22 is substantially complete except for cutting and perforating. At this point, therefore, the assembled multiple-ply strip 20 is fed to a final processing station (not shown) which forms the longitudinal perforations 54 and 56 of FIG. 1 and divides the strip 20 into individual forms 22. The latter step may consist of forming the transverse perforations 46 and 48 of FIG. 1 if connected forms are desired, or of cutting completely through the strip 20 along the lines 46 and 48 if individually cut and stacked forms are desired.

Figure 3:
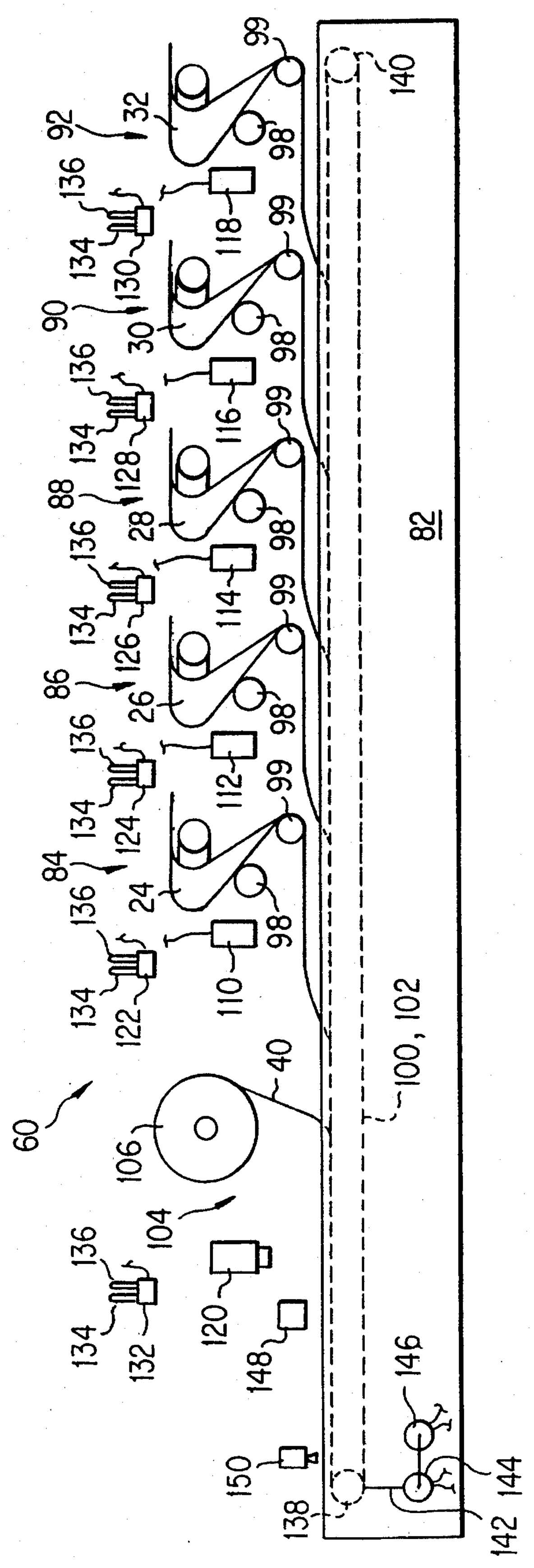
FIG. 3 is a diagrammatic side view of the pin band collator used in the printing and collating system of FIG. 2.

In the operation of the printing and collating system 60 of FIGS. 2 and 3, proper registration must be maintained in order to insure that properly matched plies (i.e., plies bearing the same tracking number at the same form location) arrive at each of the stations 84–90 and 104. In the usual situation where the tracking numbers are printed in a strict numerical sequence, this requires that the print engines 72–80 be operated in synchronism, with an offset in the numbering sequence from one print engine to the next. The amount of this offset will depend upon the relationship between the length of each form 22 in the feed direction and the distance which must be traveled by each ply before joining the succeeding ply. By exercising computer control over the print engines 72–80 in a known manner, the necessary synchronization and offset can be achieved and maintained. However, if synchronization among the print engines 72–80 is lost for some reason, or if proper registration is not maintained among the plies 24–32 and release strip 40 at the collator 82 due to a feed error or other mechanical problem, the strip 20 produced at the downstream end of the collator 82 will consist of mismatched plies and will be useless for its intended purpose.

In accordance with the present invention, a ply matching error resulting from these and other causes can be quickly detected and corrected by providing the collator 82 with a plurality of indicia sensing devices, one located at each of the stations 84–92 and 104. With continued reference to FIG. 2, and also with reference to FIG. 3, the indicia sensing devices provided at the stations 84, 86, 88, 90 and 92 comprise bar code scanners 110, 112, 114, 116 and 118, respectively. Each of the bar code scanners 110–118 is positioned above one of the plies 24–32 so that it can scan the bar codes 36 on that particular ply before the ply is overlaid by the ply introduced at the next station. In the case of the final station 104, the indicia sensing device comprises a video camera 120 rather than a bar code scanner. The video camera is positioned above the strip 20 of assembled plies near the edge at which the release strip 40 has been applied, so that the human-readable digits 44 on the labels 42 are within the field of view of the camera. A control system (not shown in FIGS. 2 and 3) is connected to the bar code scanners 110–118 and video camera 120 in order to trigger the operation of these imaging devices at the proper times, and to store their outputs for verification or matching purposes. As part of the verification or matching function, the control system produces outputs which operate visual indicators 122, 124, 126, 128, 130 and 132 located at the respective stations 84, 86, 88, 90, 92 and 104. In the preferred embodiment, each visual indicator comprises a pair of incandescent lamps 134 and 136 with red and yellow lenses, respectively. Illumination of the red lamp 134 by the control system indicates that a matching or sequence error has occurred at the corresponding station, while illumination of the yellow lamp 136 indicates that the indicia being read at the station (i.e., a bar codes 36 or the human-readable digits 44) is either of poor quality or completely unreadable. By providing these indications at each of the stations 84–92 and 104, the source of a matching or sequence error is quickly made apparent to the collator operator. Moreover, by providing an indication of poor quality or unreadable indicia at each station, in addition to an indication of a matching or sequence error per se, the operator can be provided with early warning of conditions which may require attention. For example, toner clumps in the print engines 72–80 of FIG. 2 may result in bar codes 36 which, while scannable, give the final product a poor appearance. This situation will not necessarily result in a matching or sequence error, but the illumination of the yellow warning lamp 136 will alert the operator to the problem so that any necessary corrections can be made.

With continued reference to FIG. 3, the pin bands 100 and 102 are mounted on pulleys 138 and 140 located at either end of the collator 82. The pulleys are driven by a shaft 142 which forms a part of the drive system (not shown) for the collator 82. In order to provide synchronization for the bar code scanners 110–118 and video camera 120, the shaft 142 is coupled to an angular resolver 144 and also to a shaft encoder 146. As will be described shortly, the resolver 144 allows the control system to produce appropriate synchronization signals for the bar code scanners 110–118, while the encoder 146 allows the control system to produce synchronization signals for the video camera 120. The resolver 144 and encoder 146 serve as motion sensors for detecting the velocity and displacement of the pin bands 100 and 102, and hence of the individual webs or plies 24–32 and release strip 40 carried by the collator 82. Proper synchronization also requires that the precise position of each form 22 be known as it advances through a given one of the stations 84–92 and 104. This is achieved by means of a photoelectric detector 148, which is mounted near the downstream or output end of the collator 82 and positioned to detect the registration marks 58 on the edges of the form strip 20. Since the plies 24–32 and release strip 40 are continuous and the registration marks 58 are spaced apart by a known and fixed distance, the detection of the registration marks by a single photoelectric detector 148 at a known location provides an indication of the relative position of each form 22 at the respective stations 84–92 and 104. This information, together with the information provided by the resolver 144 and encoder 146, allows the bar code scanners 110–118 and video camera 120 to be triggered at the proper times.

In the illustrated embodiment, a solenoid-controlled spray unit 150 is located at the downstream end of the collator 82. The purpose of the spray unit 150 is to deposit a red dye on forms 22 with mismatched plies or other defects, before the forms 22 are perforated or cut by the final processing station 108. The spray unit 150 is actuated by the control system whenever a matching or sequence error occurs (i.e., whenever the red error lamp 134 is illuminated at one or more of the stations 84–92 and 104). This allows defective forms to be accurately identified and discarded after an error has occurred, without the need to discard forms which may not in fact contain errors. Another advantage of the spray unit 150 is that it allows for the possibility of correcting matching or sequence errors without stopping the collator 82 to remove the defective portion of the strip 20, since the defective products can easily be identified later on after the error has been corrected. Correction of matching or sequence errors "on the fly" may result in a greater number of defective forms being produced, but this may be a less serious consequence than the down time that results when the collator 82 must be stopped and restarted.

Figure 4:
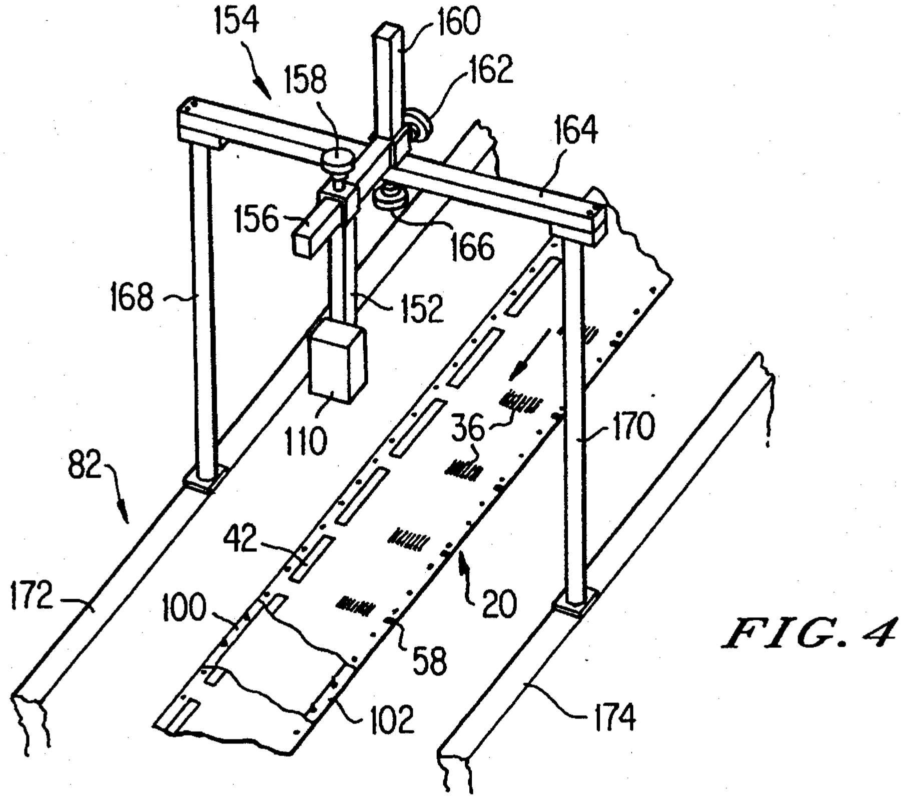
FIGS. 4–6 are detailed perspective views illustrating the manner in which the bar code scanners and video cameras used in the automatic verification or matching system may be mounted at the collator stations.

FIG. 4 is a detailed perspective view illustrating the manner in which the bar code scanner 110 is mounted on the collator 82 at the station 84. It will be understood that the remaining bar code scanners 112–118 are mounted similarly at the respective stations 86–92. As shown, the bar code scanner 110 is affixed to a vertical bar 152 which forms a part of a mounting bracket 154. The vertical bar 152 is slidable along a horizontal bar 156 which extends parallel to the feed direction of the form strip 20, and is held in place by means of a screw-type clamp 158. This allows the bar code scanner 110 to be adjusted back and forth along the feed direction of the form strip 20. The horizontal bar 156 is, in turn, slidably mounted on a vertical bar 160 and held in place by a second screw-type clamp 162. By adjusting the position of the horizontal bar 156 with respect to the vertical bar 160, the height of the bar code scanner 110 above the form-strip 20 can be adjusted. Finally, the vertical bar 160 is slidably mounted on a horizontal bar 164 which extends transversely across the width of the collator, and is held in place by a third screw-type clamp 166. By sliding the vertical bar 160 with respect to the horizontal bar 164, the transverse position of the bar code scanner 110 with respect to the form strip 20 can be adjusted. Vertical supports 168 and 170 are attached to the side plates 172 and 174, respectively, of the collator 82 and serve to support the horizontal bar 164 at a desired height above the form strip 20.

Figure 5:
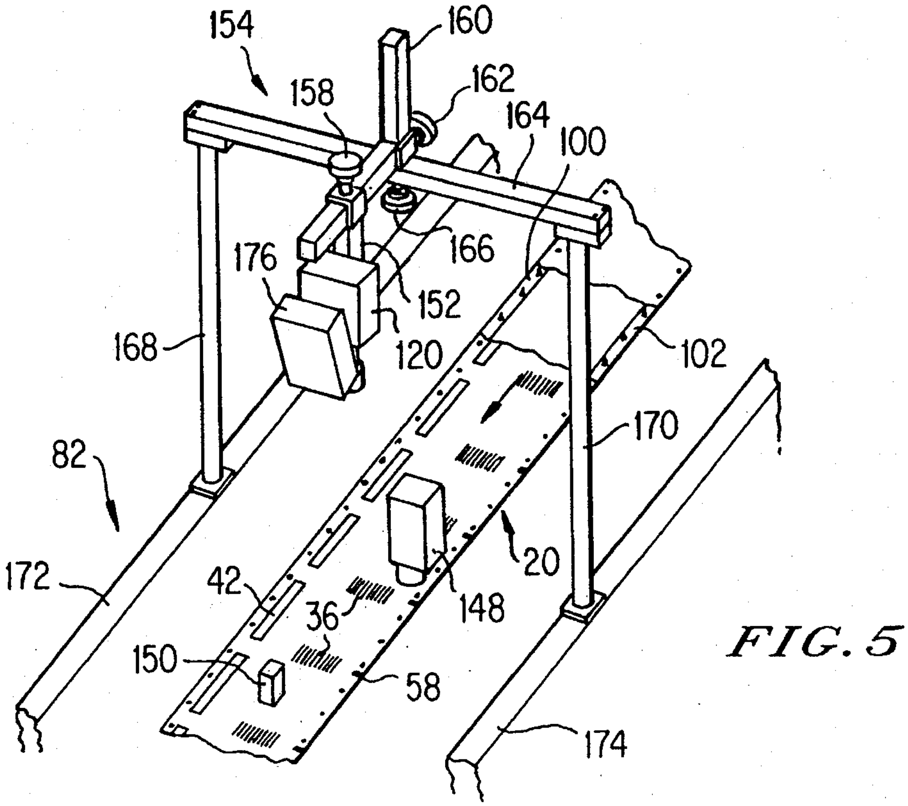

FIG. 5 illustrates the manner in which the same type of mounting bracket 154 is used to support the video camera 120 at the collator station 104. Preferably, a strobe light unit 176 is mounted next to the video camera 120 to freeze the image on the continuously moving form strip 20. This allows the video camera 120 to obtain a clear image of the digits 44 on the release strip 40 even if its exposure time is relatively long in comparison to the rate of movement of the form strip 20. However, if the exposure time of the video camera 120 is sufficiently short, the strobe light unit 176 can be deleted.

Also illustrated in FIG. 5 are the photoelectric detector 148 and spray unit 150 of FIGS. 2 and 3. Appropriate brackets or mounting devices (not shown) are provided for these devices. The photoelectric detector 148 is positioned along the right-hand side of the form strip 20 in FIG. 5, so that it will detect the registration marks 158 as they pass below it. The spray unit 150 may be positioned as desired in order to apply a line of colored dye or ink along the middle or any other desired portion the form strip 20 before the strip is discharged from the collator 82.

Figure 6:
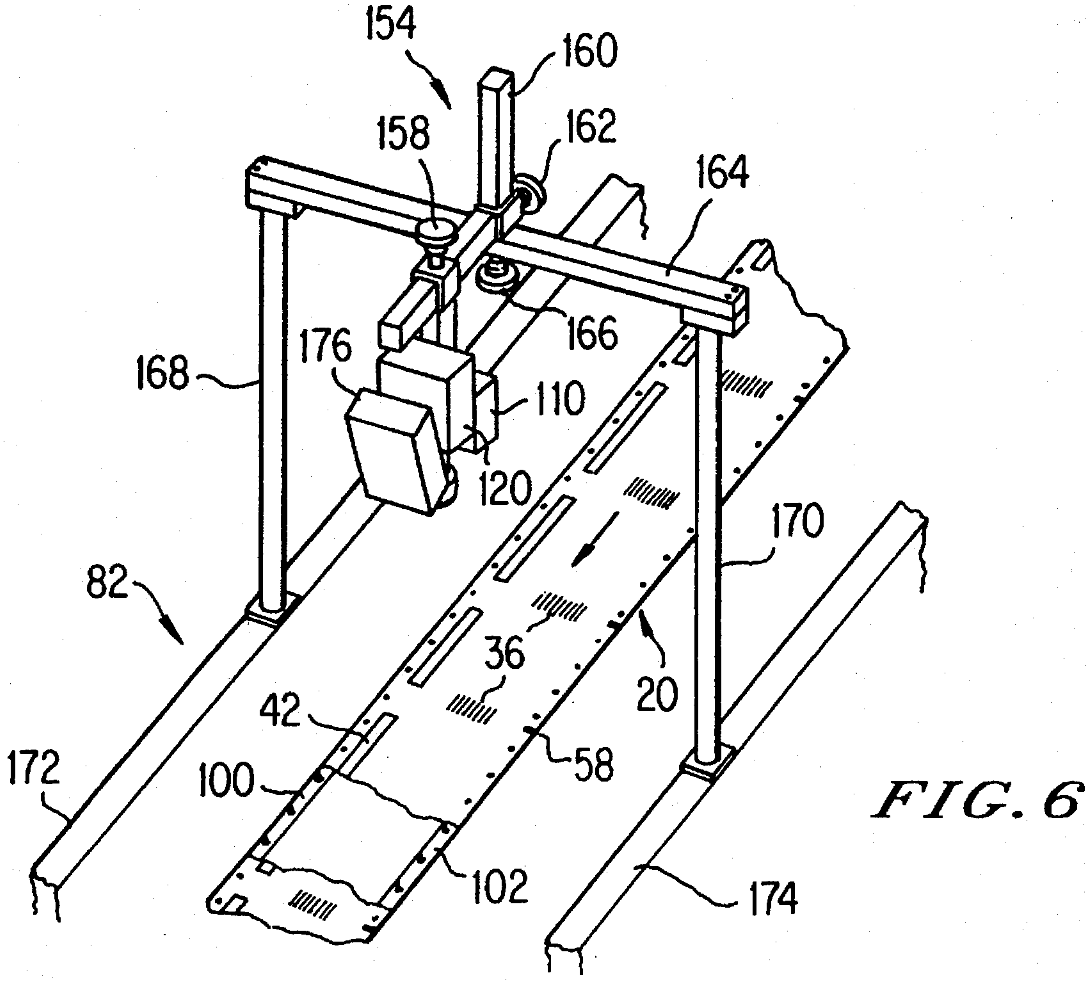

FIG. 6 illustrates an optional arrangement in which a bar code scanner 110, video camera 120 and strobe light unit 176 are all mounted on the same bracket 154. Although this arrangement is not used in the printing and collating system 60 shown in FIGS. 2 and 3, it may be desirable in cases where a ply containing two separate variable indicia printed at different times and/or by different printing devices is introduced at one of the stations of the collator 82. In this situation, the use of two separate imaging devices at the same collator station allows the two indicia to be compared as the ply is being introduced to the collator 82, so that an incorrectly printed ply can be detected before it is assembled with other plies.

Figure 7:
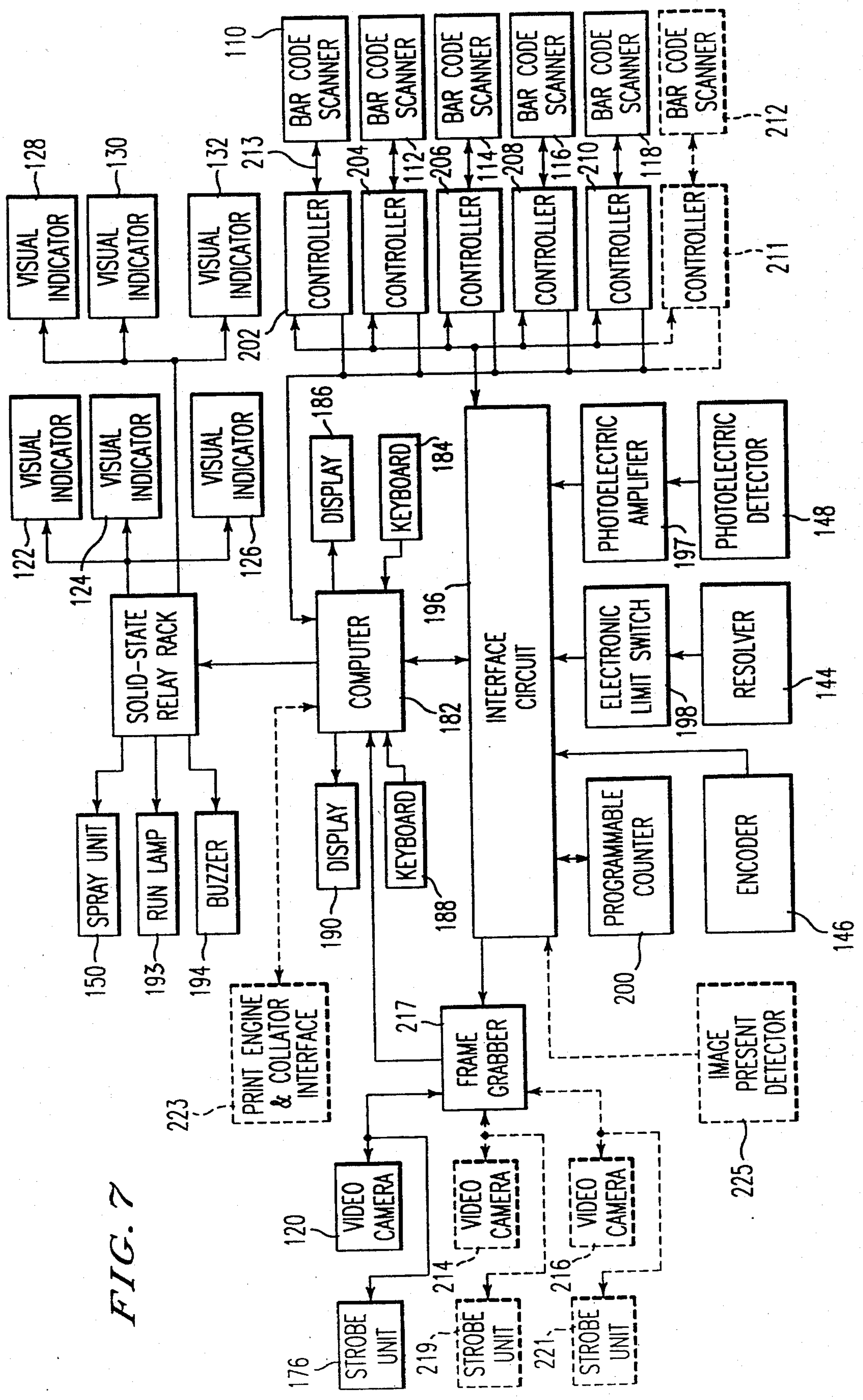
FIG. 7 is a block diagram of the principal electrical components of an automatic verification or matching system in accordance with an embodiment of the present invention.

FIG. 7 is a block diagram of the principal electrical components of the verification or matching system in accordance with a preferred embodiment of the present invention. Except for the bar code scanners and other components already described as being mounted on the collator 82, most of the components shown in FIG. 7 are housed in a remote cabinet which is connected to the collator 82 by means of appropriate cables. Overall system control is provided by an industrial computer 182, which may comprise a Series 5000 rack mount computer manufactured by Cormark Corporation of Medfield, Mass. and equipped with an Intel 486 or 586 processor operating at 66 MHz. The computer 182 is connected to a keyboard 184 and video display terminal 186, which are preferably located in the remote cabinet to allow an operator to perform initial set-up operations and to monitor system status and error conditions. A second keyboard 188 and video display terminal 190 are located outside the cabinet at a point on or near the collator 82, so that they are conveniently accessible to the collator operator. Outputs from the computer 182 are connected to a rack 192 of solid state relays which operate certain components mounted on the collator 82. These include the visual indicators 122–132, the spray unit 150, a run lamp 193 which is illuminated whenever the system is in operation, and a buzzer 194 which alerts the collator operator in the event that a matching or sequence error is detected. The computer 182 is also connected to an interface circuit 196, to be described in more detail in connection with FIGS. 8–10. The interface circuit 196 receives inputs from the computer 182, from the encoder 146 of FIG. 3, and also from the photoelectric detector 148 of FIG. 3 via a photoelectric amplifier 197. The interface circuit 196 receives additional inputs from a multiple-channel electronic limit switch 198 which is connected to the resolver 144 of FIG. 3, and from a programmable counter 200 which operates in conjunction with the encoder 146. In the preferred embodiment, the electronic limit switch 198 comprises a Model M1051 PLS 16-channel device manufactured by Autotech Controls of Carol Stream, Ill., and the programmable counter 200 comprises a Max Position 1 4-channel unit manufactured by Danachef Controls of Gurnee, Ill. One output channel of the electronic limit switch 198 is used for each of the bar code scanners connected to the system, and one output channel of the programmable counter 200 is used for each video camera.

Outputs from the interface circuit 196 are connected to five bar code scanner control units 202, 204, 206, 208 and 210, one corresponding to each of the bar code scanners 110, 112, 114, 116 and 118 of FIG. 3. Provision is also made for connecting a sixth control unit 211 to the interface circuitry 196 in order to accommodate a sixth bar code scanner 212, in case an additional scanner is needed in certain applications. Each control unit 202–211 is connected to its respective bar code scanner by means of a cable 213 extending between the remote cabinet and the collator 82, and functions both to control the operation of the scanner and to decode the scanner output data. In a preferred embodiment, the bar code scanners 110–118 and 212 comprise Scanstar Model 10 laser diode scanners manufactured by Computer Identics Corporation of Canton, Mass., and the control units 202–211 comprise Scanstar Model 242i decoders manufactured by the same company. The bar code data decoded by the control units 202–211 is applied as input data to the computer 182 via lines 215 as shown in FIG. 7.

The interface circuit 196 of FIG. 7 also provides trigger signals for the video camera 120. Although only one video camera 120 is employed in the arrangement shown in FIGS. 2 and 3, the interface circuitry preferably provides outputs for two additional video cameras 214 and 216. The video cameras 120, 214 and 216 may be of any desired type, but preferably comprise charge-coupled device (CCD) array cameras with either one or two dimensional CCD arrays. In the preferred embodiment, the video cameras 120, 214 and 216 comprise Model TI-324A two dimensional CCD array cameras manufactured by NEC America, Inc. of Irving, Tex., with type 05 modifications to interlace the two scan fields and thereby improve image resolution at high web speeds. The video cameras 120, 214 and 216 are connected to the computer 182 and to the interface circuit 196 by means of a frame grabber board 217, which preferably comprises a Data Raptor VL data acquisition board manufactured by Bit Flow, Inc. of Woburn, Mass. In addition to providing control for the video cameras 120, 214 and 216 and transmitting image data to the computer 182, the frame grabber board 217 also triggers the strobe light unit 176 for the video camera 120 and similar strobe light units 219 and 221 for the video cameras 214 and 216, respectively. Although shown as a separate component in FIG. 7, the frame grabber board will normally be provided as a plug-in board within the computer 182. The computer 182 also includes suitable optical character recognition (OCR) hardware and software for processing images produced at the camera outputs and received by the frame grabber board 217. An example of a suitable OCR hardware/software package is the Textpert system available from CTA Corporation of New Haven, Conn., which is capable of processing up to 40,000 alphanumeric characters per minute. This is more than sufficient for recognizing the characters 44 in the labels 42 of FIG. 1 at the web speeds contemplated by the present invention. It will be understood that the computer 182 also includes suitable memory for storing the programming required for the operation of the verification system, input/output boards for establishing connections to the solid state relay rack 192 and interface circuit 196, and communication ports for receiving data from the bar code scanner control units 202–212 and video cameras 120, 214 and 216. These components are conventional and have been omitted from FIG. 7 in the interest of simplicity.

Also shown in FIG. 7 is an optional print engine and collator interface 223 which is connected to the computer 182. In instances where it is desired to resequence the print engines 72–80 automatically after a matching or sequence error has been detected, the print engine and collator interface 223 allows the collator 82 to be placed in a jog mode while the necessary correction data is sent to the computers (not shown) which control the print engines 72–80. Another optional component that is shown in FIG. 7 is an image present sensor 225, which may be connected to the interface circuit 196 (or, in some cases, directly to the computer 182). The image present sensor 225 may be mounted at one or more of the collator stations 84–92 and 104 to determine whether an image (e.g., a bar code 36 or digits 44) is present at a predetermined position in the form strip 20, without actually scanning or decoding the image. The image present sensor 25 is useful in instances where the detection of a blank or unprinted form ply (i.e., a ply which has not been printed with any variable information) is all that is needed at a particular collator station. For this purpose, the image present sensor may consist of a photoelectric detector and amplifier similar to the components 148 and 197, appropriately calibrated to detect the presence or absence of a printed image on the form strip 20.

Figure 8:
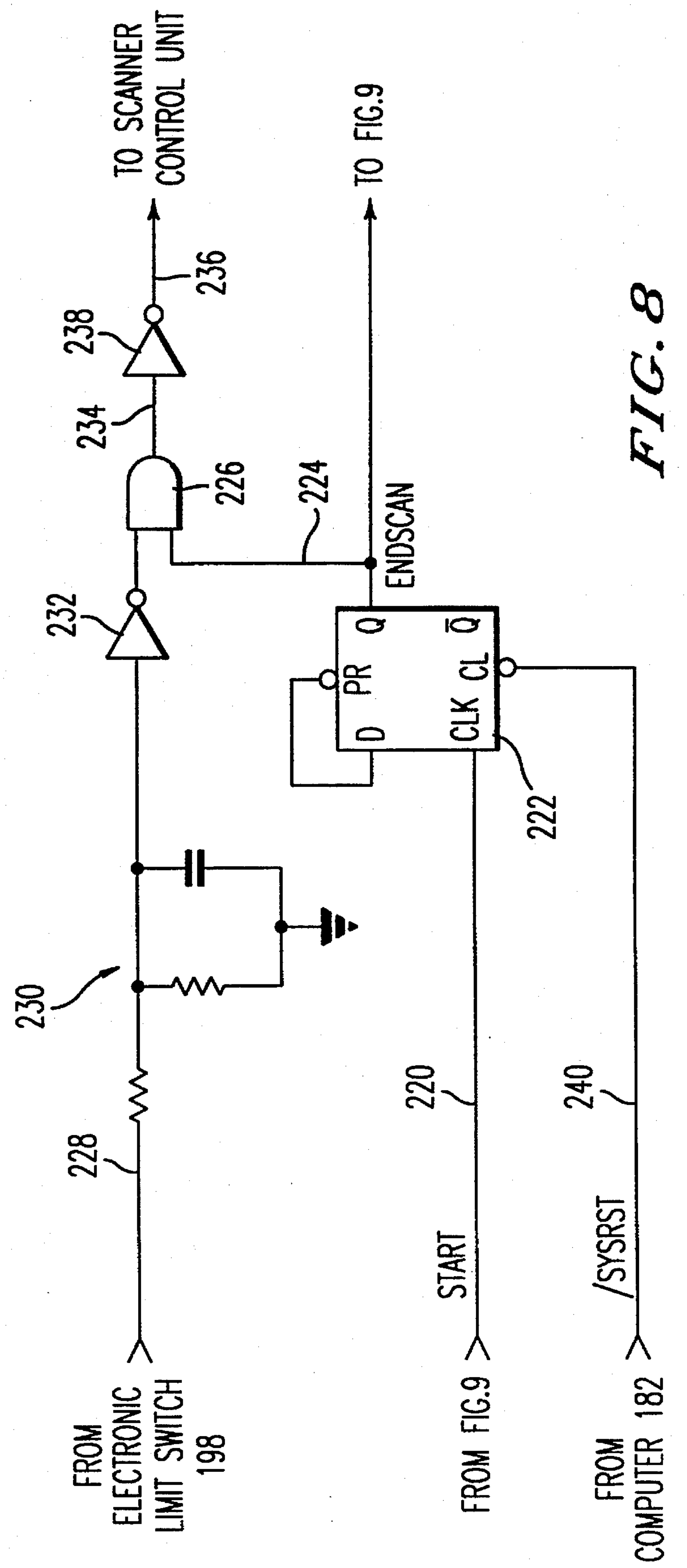
FIGS. 8–10 are electrical schematic diagrams illustrating the details of an interface circuit shown in FIG. 7.

FIG. 8 is a schematic diagram of a portion of the interface circuit 196 which provides inputs to one of the bar code scanner control units 202–212. A START signal (whose origin will be described shortly in connection with FIG. 9) appears on an input line 220 whenever a registration mark 58 on the form strip 20 is detected by the photoelectric detector 148. The START signal is applied to the CLOCK input of a D-type latch or flip-flop 222 and causes the Q output of the latch to transition to a high logic level. This produces a signal referred to as ENASCAN on line 224, which is applied to one input of an AND gate 226. The second input of the AND gate 226 is connected to one output channel 228 of the electronic limit switch 198 of FIG. 7 via an RC filtering network 230 and an inverter 232. The output 234 of the AND gate 226 is connected to the input 236 of the bar code scanner control unit by means of a further inverter 238. In operation, the first detection of a registration mark 58 by the photoelectric detector 148 will give rise to the START and ENASCAN signals, causing one input of the AND gate 226 to transition to a high logic level. However, the other input of the AND gate 226 is not brought high until an input in produced on line 228 by the electronic limit switch 198. This, in turn, does not occur until rotation of the resolver 144 by the collator shaft 142 causes the electronic limit switch 198 to reach its programmed "on" position (determined by the operator during initial set-up) for the output channel in question. This position is set to correspond to the arrival of the leading edge of a bar code 36 at the collator station where the bar code scanner is located. With both inputs of the AND gate 226 brought high, the output 234 of the AND gate is enabled and a signal is produced on line 236 which causes the scanner control unit to begin decoding the digital outputs that are continually being received from bar code scanner. This condition persists until the electronic limit switch 198 reaches its programmed "off" position for the output channel in question, at which point the input signal is removed from the line 228 and the AND gate 226 is disabled, causing the scanner control unit to stop decoding the data produced by the bar code scanner. The programmed "off" position of the electronic limit switch 198 (also pre-set by the operator) is set to correspond to the trailing edge of the bar code 36 that has Just been scanned. Thus, by virtue of circuitry shown in FIG. 8, the bar code scanner control unit is enabled for the proper interval to allow complete scanning of the bar code 36. During this interval, a large number of individual scans will normally be made of the bar code 36, depending upon the scanning rate of the laser within the scanner and the length of the bar code in the collator feed direction. The number or proportion of successful scans will provide a measure of the quality of the printed bar code 36 for monitoring purposes.

With continued reference to FIG. 8, the computer 182 provides a low logic level /SYSRST signal on line 240 during initial power-up to initialize the scanning procedure. This signal is applied to the CLEAR input of the latch 222. This insures that the ENASCAN signal is not produced on line 224 until a START signal is received on line 220, and thus prevents premature triggering of the bar code scanner. Only a single latch 222 is required for all of the bar code scanners 110–118 and 214, but the remaining components shown in FIG. 8 are duplicated for each of the bar code scanners used in the system.

Figure 9:
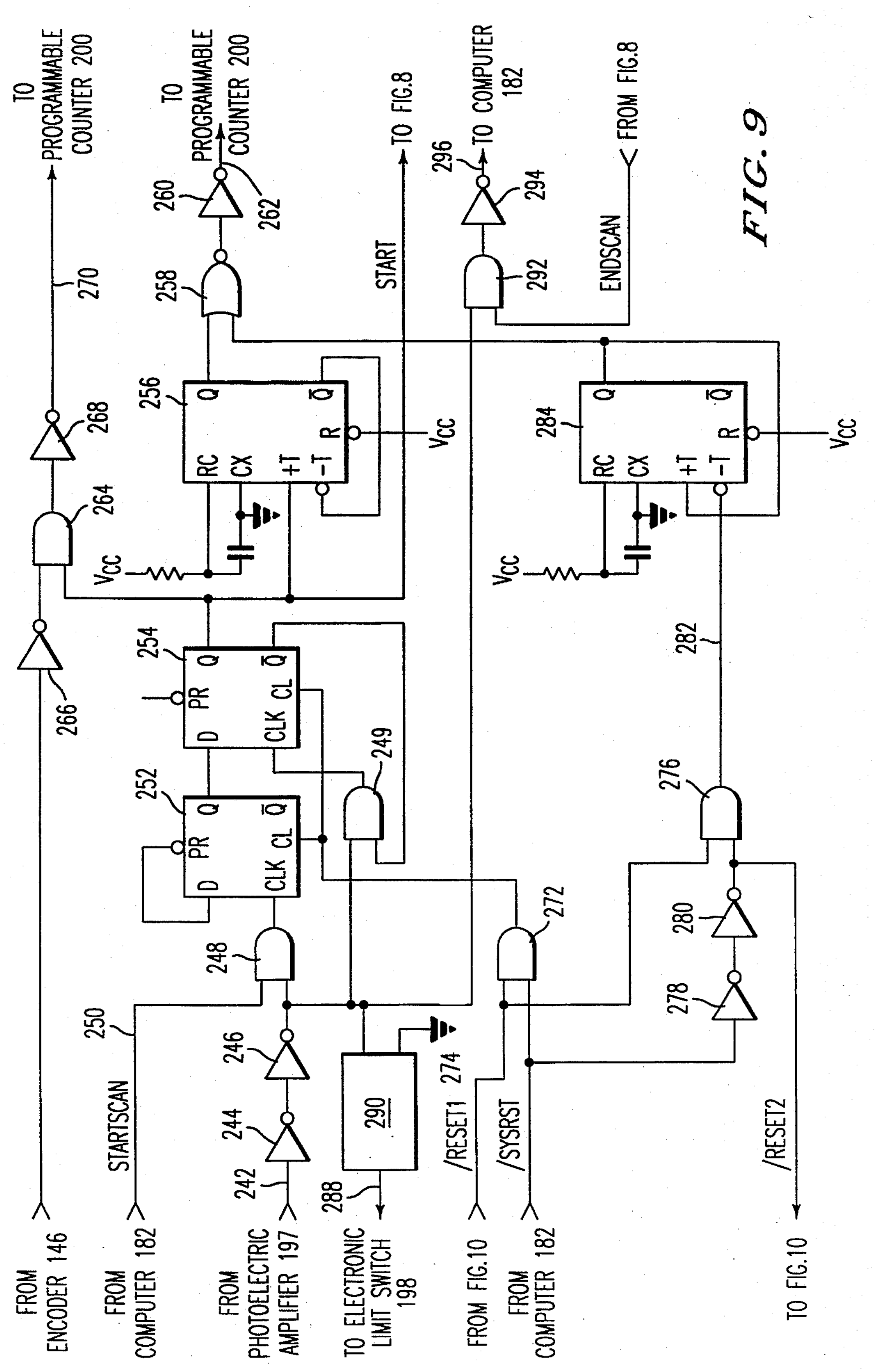

FIG. 9 is a schematic diagram of a portion of the interface circuit 196 of FIG. 7 which receives inputs from the photoelectric detector 148 and photoelectric amplifier 197. When a registration mark 58 is detected by the photoelectric detector 148, an input signal from the photoelectric amplifier 197 appears on line 242 and is applied through two inverters 244 and 246 to one input of an AND gate 248. The other input of the AND gate 248 is connected to an input line 250 which receives a signal referred to as STRTSCAN from the computer 182. The STRTSCAN signal is continuously produced after the operator places the system in the RUN mode using a menu which appears on one of the display monitors 186 or 190 of FIG. 7. Thus, the AND gate 248 is enabled whenever the STRTSCAN signal and the occurrence of a registration mark 58 at the photoelectric detector 148 coincide. When this occurs, CLOCK inputs are applied by the AND gate 248 and a second AND gate 249 to a pair of latches 252 and 254, thereby producing and latching the START signal at the Q output of the latch 254. The START signal is applied to the trigger input of a one-shot multivibrator 256, which responds by producing an output pulse of predetermined duration at its Q output. The output pulse is applied through an OR gate 258 and inverter 260 to an output line 262. The output line 262 is connected to the reset input of the programmable counter 200 of FIG. 7, and serves to reset the accumulated count to zero. The START signal at the Q output of the latch 254 is also applied to one input of an AND gate 264, the second input of which receives pulses from the shaft encoder 146 of FIG. 7 through an inverter 266. These pulses appear at the output of the AND gate 264 whenever the START signal latched by the latches 252 and 254 is present, as will be the case after a registration mark 58 has been detected by the photoelectric detector 148. From the output of the AND gate 264, the encoder pulses are applied to the input of an inverter 268. The output line 270 of the inverter 268 is connected to the pulse counting input of the programmable counter 200 in FIG. 7. As a result of this arrangement, output pulses from the encoder 146 will be counted by the programmable counter 200 beginning with the detection of a registration mark 58 by the photoelectric detector 148, and the accumulated count will represent the distance traveled by the form strip 20 from the point at which the registration mark was detected. As will be described further in connection with FIG. 10, the video camera 120 is triggered when the programmable counter 200 reaches a preset count (determined by the operator during initial set-up) that corresponds to a position of the form strip 20 at which the digits 44 on the label 42 are within the field of view of the video camera 120.

With continued reference to FIG. 9, the pulse output on line 270 will continue until the latches 252 and 254 are cleared, which removes the START signal and disables the AND gate 264. The latches 252 and 254 are cleared by means of an AND gate 272, which receives as one input the/SYSRST input from the computer 182 and as a second input a momentary low logic level signal referred to as /RESET1 that occurs on an input line 274. The /RESET1 signal originates from the programmable counter 200, as will be discussed shortly in connection with FIG. 10, and its occurrence signifies that the collator shaft 142 has rotated by an amount corresponding to the length of one form 22 at the pin bands 100 and 102. When either the /RESET1 or/SYSRST signal occurs, the output of the AND gate 272 goes low and clears the latches 252 and 254. The RESET1 signal is also applied to one input of an AND gate 276, the other input of which receives the/SYSRST signal from the computer 182 through inverters 278 and 280. When either the/RESET1 or/SYSRST signal occurs, the output of the AND gate 276 on line 282 is driven low and triggers the negative trigger input of a one-shot multivibrator 284. The Q output of the one-shot multivibrator 284 is connected to the second input of the OR gate 258. Thus, when the one-shot multivibrator 284 is triggered, an output is produced on line 262 to reset the programmable counter 200 to zero. The output of the inverter 280, in addition to providing one input to the AND gate 276, also provides a low logic level signal /RESET2 which is utilized in the interface circuitry of FIG. 10 in a manner to be discussed shortly.

The output of the inverter 246 in FIG. 9 is connected to an output line 288 via a current sourcing device 290. The output line 288 is connected to the reset cycle input of the electronic limit switch 198 in FIG. 7, and causes the electronic limit switch 198 to begin counting toward its programmed "on" and "off" settings with every registration mark 58 that is detected by the photoelectric detector 148. In the preferred embodiment utilizing an Autotech Model M1051 PLS device as the electronic limit switch 198, the line 288 is connected to the ModZ input of the electronic limit switch. A separate "on" and "off" setting is programmed by the operator for each of the bar code scanners 110–188 and 214, and corresponds to the arrival of the leading and trailing edges, respectively, of one of the bar codes 36 at the scanner in question. The output of the inverter 246 is also applied to one input of an AND gate 292, the other input of which receives the ENASCAN signal from the interface circuitry of FIG. 8. The output of the AND gate 292 is connected through an inverter 294 to an output line 296. The output line 296 is connected through an RS-232 driver (not shown) to the computer 182 of FIG. 7, and provides a signal to the computer to indicate that a registration mark 58 has been detected by the photoelectric detector 148. This triggers an interrupt in the computer 182 which allows the computer 182 to keep track of each successive form 22.

Figure 10:
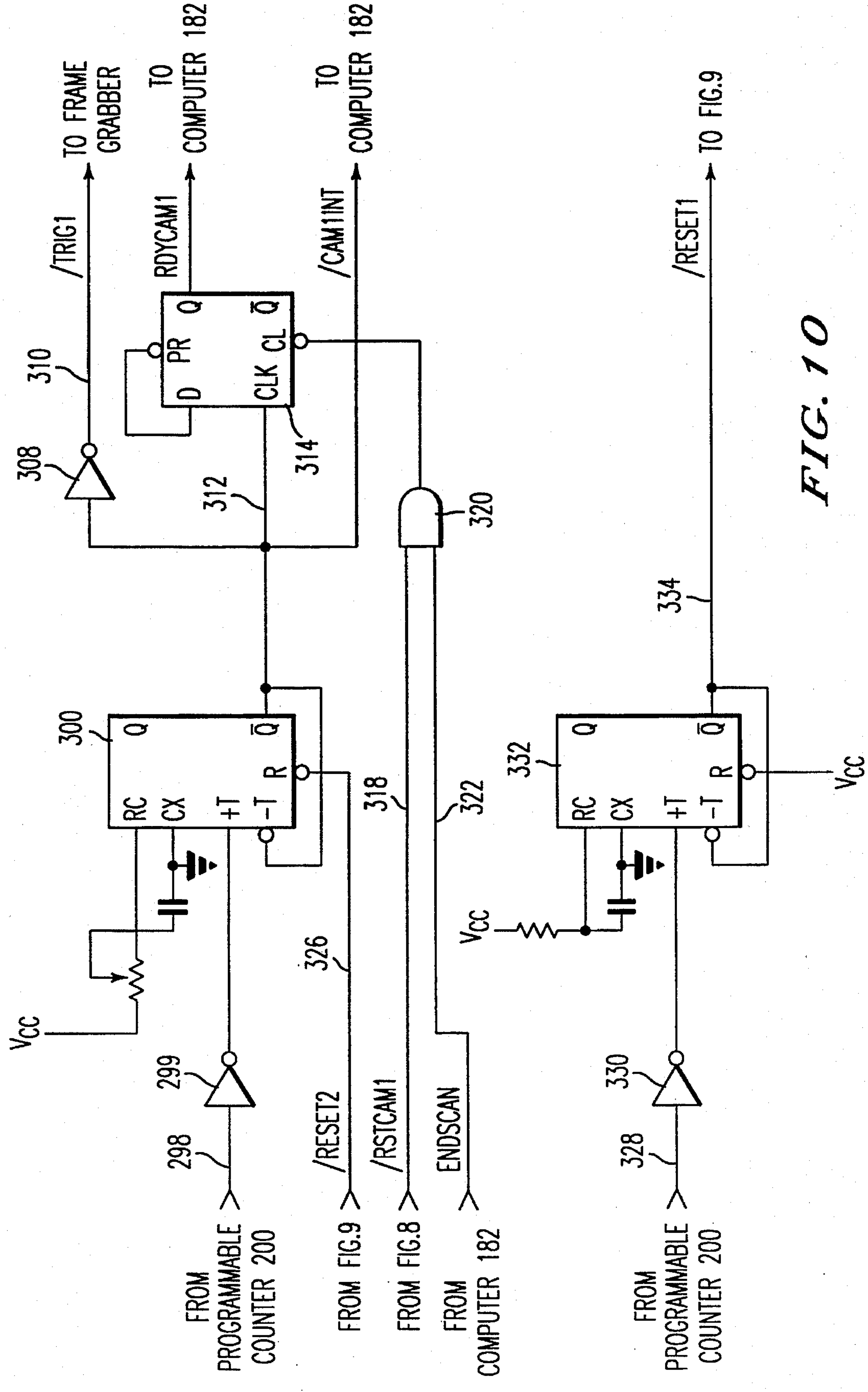

FIG. 10 is a schematic diagram of a portion of the interface circuit 196 which receives outputs from the programmable counter 200 of FIG. 7. The programmable counter 200 has a number of output channels, each of which can be controlled separately when the counter reaches a predetermined count. One of these channels is represented by the input line 298 in FIG. 10, which is connected through an inverter 299 to the trigger input of a one-shot multivibrator 300. When an input is received from the programmable counter 200 on line 298, the one-shot multivibrator 300 produces a pulse of predetermined duration at its $\overline{Q}$ output 302. The $\overline{Q}$ output of the one-shot multivibrator 300 is connected through an inverter 308 to an output line 310 that produces a signal of fixed duration designated/TRIG1. The output line 310 is connected to the frame grabber board 217 of FIG. 7, and causes the video camera 120 to produce an output representing the image in the camera frame at the moment that the /TRIG1 signal appears. The $\overline{Q}$ output of the one-shot multivibrator 300 also produces a/CAM1INT signal on line 312, which provides an input to the computer 182 via the RS-232 driver referred to earlier. The/CAM1INT signal generates an interrupt which causes the software of the computer 182 to respond by selecting the video camera 120 and triggering the frame grabber board 217 to acquire the image at the camera output. The/CAM1INT signal is also applied to the CLOCK input of a latch 314, causing the Q output of the latch 314 to transition to a high logic state on the positive transition of/CAM1INT. This produces a signal referred to as a RDYCAM1 on line 316, which provides an input to the computer 182. The RDYCAM1 signal identifies the video camera 120 as the particular camera which has been triggered, and signals the computer 182 to receive an image from the frame grabber board 217. After the image from the video camera 120 has been received and processed by the computer 182, the computer produces a signal referred to as /RSTCAM1 on an input line 318. This signal is applied to one input of an AND gate 320, the other input of which receives the ENASCAN signal from the circuitry of FIG. 8. When the ENASCAN signal occurs on line 322 (indicating that the photoelectric detector 148 has sensed a new registration mark 58) and the /RSTCAM1 signal occurs on line 318, the AND gate 320 is enabled and a signal is applied to the CLEAR input of the latch 314 via line 324. This causes the RDYCAM1 signal to be removed from the output line 316, thereby preparing the circuit for another operating cycle. The one-shot multivibrator 300 is reset by the occurrence of the /RESET2 signal (produced by the circuitry of FIG. 9) on an input line 326. Since the /RESET2 signal is produced in response to a /SYSRST signal from the computer 182, this insures that the one-shot multivibrator 300 is not inadvertently triggered at the moment of system start-up.

With continued reference to FIG. 10, one of the output channels of the programmable counter 200 produces a signal on an input line 328 when a count representing the length of one form 22 has been accumulated. This signal is applied via an inverter 330 to the trigger input of a one-shot multivibrator 332. The $\overline{Q}$ output of the one-shot multivibrator 332 produces the /RESET1 signal of FIG. 9 on output line 334, which is used to reset the count of the programmable counter 200 to zero. It will be appreciated that, with the exception of the circuit containing the inverter 330 and one-shot multivibrator 332, the components of FIG. 10 are duplicated for each of the video cameras 120, 214 and 216 of FIG. 7. The maximum number of video cameras will depend upon the number of output channels available on the programmable counter 200.

Figure 11A:
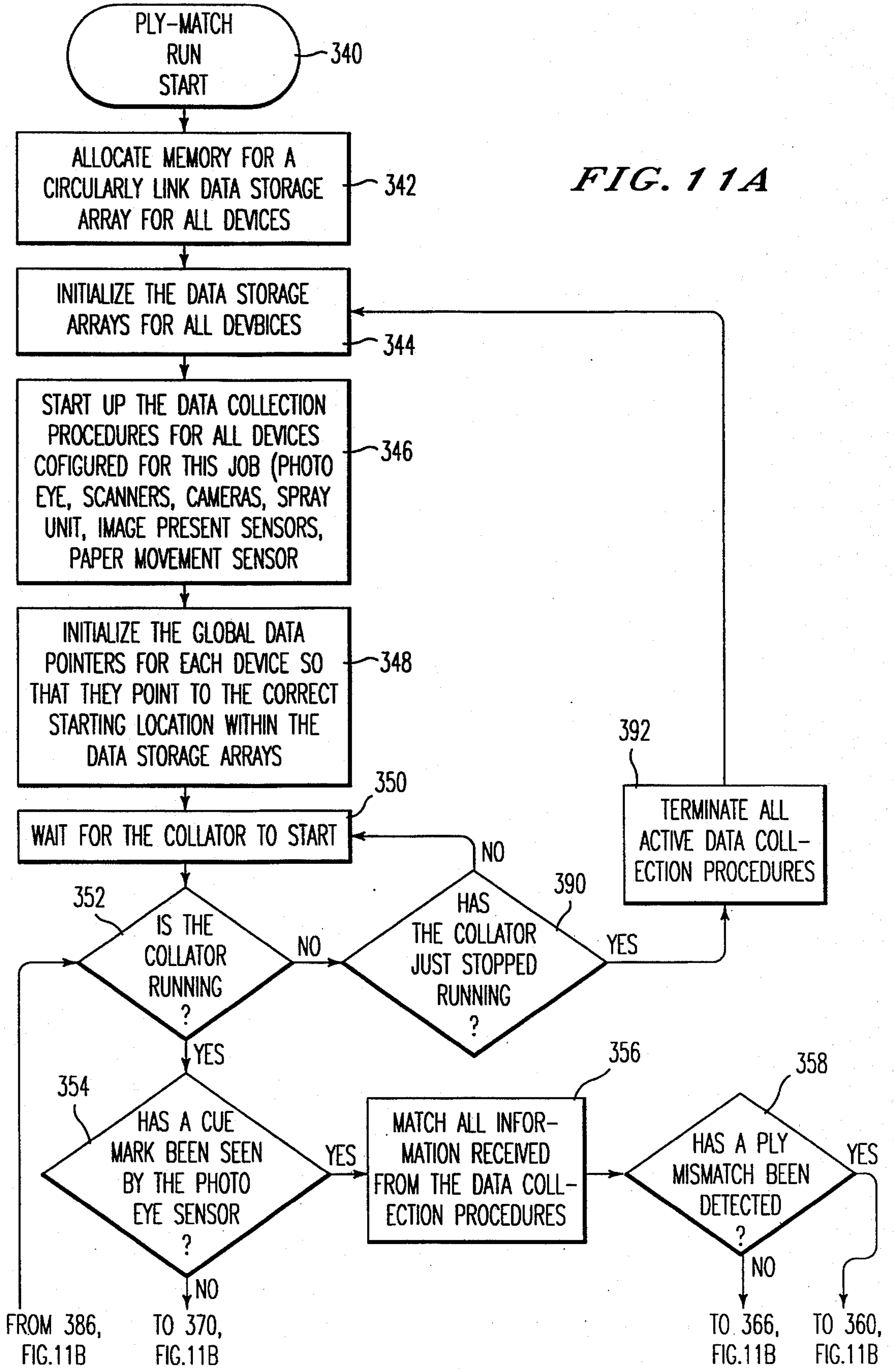
FIGS. 11 and 13 are a flow charts illustrating the manner in which the computer shown in FIG. 7 is programmed to carry out the automatic verification or matching operation.
Figure 11B:
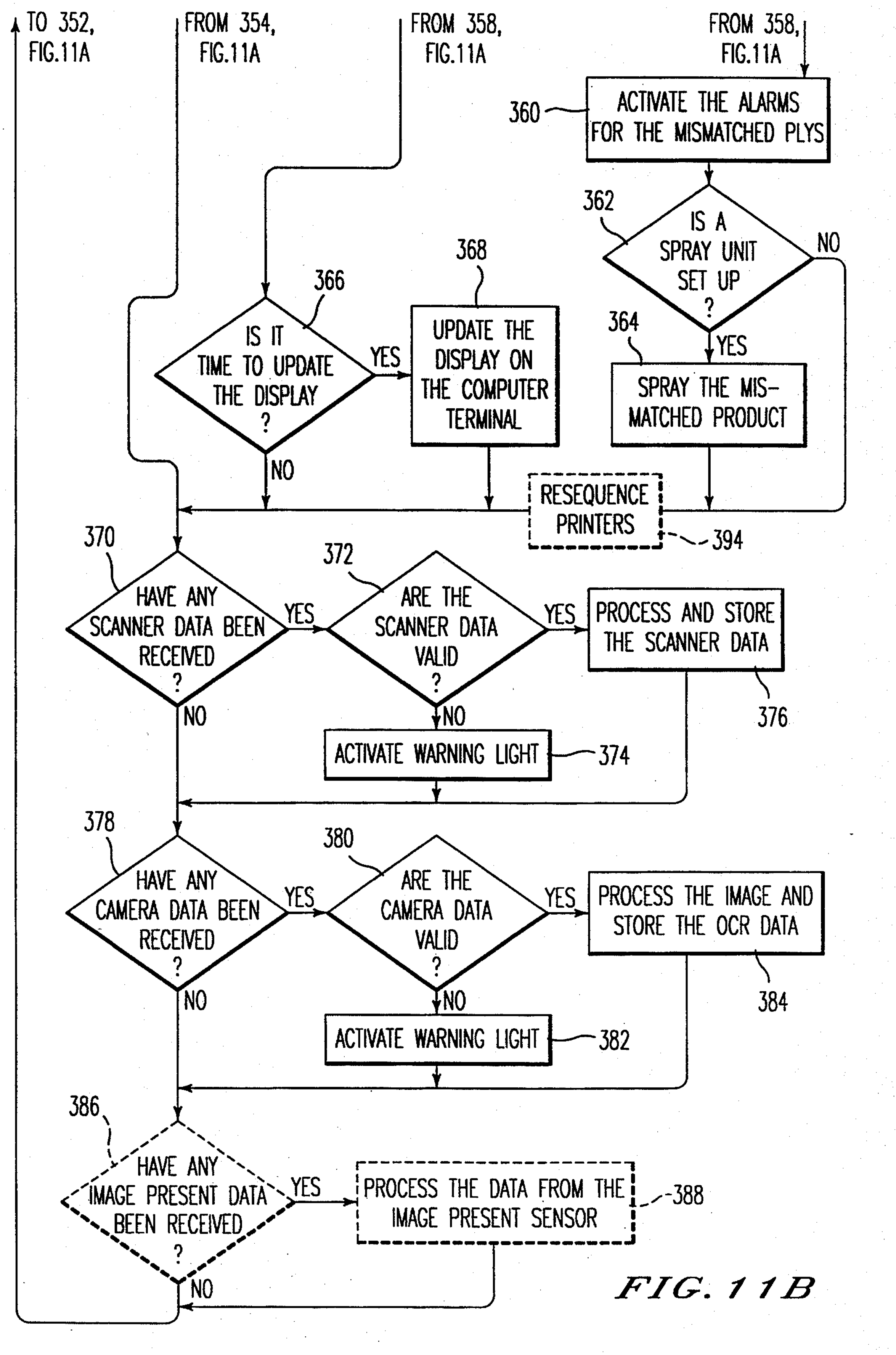

FIG. 11 is a flow chart illustrating the manner in which the computer 182 of FIG. 7 is programmed to control the verification of matching operation. In block 340, a power-up routine is executed during which various initialization and diagnostic tasks are performed. When these are completed, the computer proceeds to block 342 allocates a section of memory to be used for storing output data from the bar code scanners 110–118 and 214 and video cameras 120, 214 and 216. The manner in which this section of memory is organized is shown diagrammatically in FIG. 12 for the video camera 120 and three of the bar code scanners 110–118, and it will be understood that the same arrangement is employed for the remaining bar code scanners. The total number of bar code scanners and video cameras to be used is specified by the operator during initial set-up. For each bar code scanner and video camera in use, the computer reserves in memory a recirculating first-in, first-out (FIFO) buffer having a number of storage locations equal to the number of forms 22 which are present on the collator 82 at any given time. In the preferred embodiment of the invention, which is designed for use with forms 22 having a length of six inches in the feed direction, a maximum of 256 locations are available in each FIFO buffer. The FIFO buffers are configured as singularly linked lists, with each buffer location containing an index value, the scanner or camera data and a pointer indicating the next buffer location. The pointer in the last buffer location points to the first buffer location, thereby creating a recirculating queue that emulates the physical motion of the forms 22 along the collator 82. A similar FIFO buffer is maintained for the photoelectric detector 148, with each buffer location containing an index value and a pointer indicating the next location. The computer 182 also maintains global pointers, one for each FIFO buffer, which point to specific locations in the FIFO buffers that are used to store data received from the bar code scanners 110–118 and video camera 120 during operation of the verification or matching system. The global pointers (indicated at P1, C1, S1, S2 and S3 in FIG. 12) are continually incremented using the pointer values stored in the FIFO buffers, but are separated by fixed displacement values that correspond to the physical separation between the bar code scanners and video cameras on the collator 82. With each detection of a registration mark 58 by the photoelectric detector 148, the computer simultaneously increments all of the global pointers to point to the next FIFO buffer location.

Referring once again to FIG. 11, the computer 182 proceeds to block 344 after having allocated the memory in the manner shown in FIG. 12. In block 344, the individual memory locations in the FIFO buffers are initialized, and in block 346, the global pointers for each FIFO buffer are initialized. In block 348, the computer 182 initializes all of the bar code scanners, video cameras and other external devices of FIG. 7 by sending appropriate signals to the solid state relay rack 192 and interface circuit 196. In block 350, the computer 182 waits for the collator 82 to start, and repeatedly checks in block 352 to determine whether the collator is running. If so, the computer proceeds to decision block 354 and checks to determine whether a registration mark 58 has been detected by the photoelectric detector 148. If it has, the computer proceeds to block 356 and reads the data in the FIFO buffers. In the system configuration illustrated in FIGS. 2 and 3, employing five bar code scanners and one video camera, this will involve reading six FIFO buffer locations (plus an additional FIFO buffer location for the photoelectric detector 148). In decision block 358, the computer 182 checks to determine whether a ply matching error has occurred. This is preferably done in several different ways. First, assuming that all plies of the form are intended to contain identical indicia, the computer 182 checks to determine whether the data in all six of the FIFO device buffers is the same. If it is, the form 22 has been properly assembled; if not, an assembly error has occurred. In addition to verification of proper ply matching, other types of verifications can also be made. These include using the previous values of the global pointers to compare the indicia on each ply of the form with the indicia on each corresponding ply of the previous form, in order to confirm that a desired numerical sequence has been maintained. This may not be the case if, as a result of a feed or printing error, two successive forms 22 contain duplicate indicia or indicia which otherwise do not follow the desired numerical sequence. If any of these error conditions are detected, the computer 182 operates the buzzer 194 of FIG. 7 and illuminates the red error lamp 134 on the particular visual indicator 122–132 at the collator station where the error occurred. The sound of the buzzer alerts the collator operator to the fact that an error has occurred, and the location of the illuminated red warning lamp directs the operator to the appropriate collator station so that the error can be corrected. In some instances, errors may occur at more than one station simultaneously, and in such cases the red error lamps 134 at all of the involved stations are illuminated.

After any detected error conditions have been indicated in block 360, the computer 182 proceeds to decision block 362 and checks the set-up data entered by the operator to determine whether a spray unit 150 has been provided. If so, the computer proceeds to block 364 and energizes the spray unit 150 in order to apply a red dye to the forms affected by the error. Operation of the spray unit 150 continues until the error condition disappears or until a manual reset input is applied to the computer 182 by the collator operator.

Referring again to decision block 358, the failure of the computer 182 to detect an error condition causes processing to proceed to a further decision block 366. In block 366, the computer 182 checks an internal timer to determine whether the displays 186 and 190 should be updated. In the preferred embodiment of the invention, the displays 186 and 190 continually display the scanner and camera data from the FIFO buffers that are being used for the current comparison operation, together with a portions of the actual video image detected by the video camera 120. However, at high collator speeds this information will change too quickly to be read by a human operator, and hence the computer 182 is programmed to update the displays 186 and 190 according to a predetermined schedule (e.g., every fifty forms). Thus, if it is determined in block 366 that a scheduled update should be made, the computer proceeds to block 368 and updates both displays 186 and 190.

After all of the steps in blocks 356–368 have been completed (or in the event that no registration mark was detected by the photoelectric detector 148 in decision block 354), the computer 182 proceeds to decision block 370 and polls the bar code scanner control units to determine whether any scanner data is available. If so, the computer proceeds to block 372 checks the quality of the scanned bar code (and whether the code is missing entirely) by determining the number of successful scans which were made during the interval in which the bar code was within the field of view of the scanner. This is done by examining the prefix characters provided at the output of the bar code scanner control units 202–210. For a bar code 36 having a height of 1.5 inches in the collator feed direction and a collator speed of 2.5 feet per second, the bar code scanners used in the preferred embodiment of the present invention are capable of scanning each bar code 26 times as the bar code passes the scanner. In block 374, the computer 182 illuminates the yellow warning lamp 136 at the collator station in question if any of these scans are unsuccessful. Alternatively, if the bar code 36 includes check digits, the computer 182 may be programmed to illuminate the yellow warning lamp if the check digits (provided at the output of the controllers 202–210 along with the bar code data) do not correspond with the detected bar code data. If a determination is made in block 372 that the bar code is present and of acceptable quality, the computer 182 proceeds to block 376 and stores the scanner data (i.e., the detected tracking number or other indicia) in the appropriate FIFO buffer location.

After processing any available bar code scanner data, the computer 182 proceeds to decision block 378 and checks to determine whether any data is available from the video camera 120. If any data is available, the computer proceeds to block 380 and determines from the optical character recognition (OCR) software whether a readable image is present. If the OCR software is unable to process the data from the video camera 120 (e.g., because no image is present within the camera frame), or if the software diagnostics indicate that the output data is unreliable, a warning condition is present. This causes the computer 182 in block 382 to illuminate the yellow warning lamp 136 at the collator station 104 where the video camera is located. If no warning condition is present, the computer proceeds to block 384 and stores the video camera data (i.e., the tracking number of other indicia identified by the OCR software) in the appropriate FIFO buffer location. If the system is equipped with the optional image present sensor 225 of FIG. 7, the computer 182 then determines in block 386 whether the presence of an image has been detected, and if so, appropriate data is stored in an additional FIFO buffer location as indicated by block 388.

Returning to decision block 352, manual stoppage of the collator 182 by the operator (e.g., in response to the occurrence of an error or warning condition) will cause a negative determination to be made in this block. In that event, the computer 182 proceeds to decision block 390 and determines whether the collator has recently stopped running. If not, the computer returns to block 350 and waits for the collator to be restarted. If the collator has recently stopped running, the computer diverts to block 392 and terminates all active data collection procedures by sending appropriate signals to the solid state relay rack 192 and interface circuit 196. The computer then returns to block 344 and repeats the various initialization operations described previously.

With reference to blocks 354–358 of the flow chart, it will be apparent that a complete set of FIFO buffer location data for any given form 22 will not be available after the collator 82 is initially put into operation until some number of forms (determined by the length of the collator 82 and the length of an individual form 22) has been fed through the collator. Until this occurs, the detection of a registration mark 58 in decision block 354 will not enable the computer 182 to perform the desired verification or matching operation. Accordingly, the computer 182 is programmed to wait for the occurrence for a certain number of registration marks 58 before beginning the verification or matching operation.

In an optional mode of operation, the computer 182 may be programmed to automatically resequence the print engines 72–80 of FIG. 2 after a matching or sequence error has been detected. This is indicated in the flow chart of FIG. 11 by the additional block 384, which is executed by the computer following activation of the spray unit 150 in block 364. The action taken in block 394, to be described in more detail in connection with FIG. 14, will depend upon the nature of the error detected in decision block 358. For example, if sequential tracking numbers are being printed on successive forms 22 but the plies of a given form 22 do not match because the tracking number on one ply varies from the tracking numbers on the other plies by a predetermined amount, the print engines 72–80 will be resequenced in the proper direction (i.e., numerically upward or downward) to begin printing forms 22 with matching tracking numbers which follow the tracking number of the last correctly printed form. Corresponding measures may be taken in cases where the tracking number on a particular ply has been duplicated on another form or is missing entirely. The automatic resequencing of the print engines 72–80 in block 382 may in some cases avoid the need to stop the collator 82 for manual re-registration when an error condition occurs. Defective forms produced while the error persists can be readily identified after the error has been corrected, as a result of the dye applied by the spray unit 150 in block 364 of the flow chart.

In the foregoing description, it has been assumed that any stoppage of the collator 82 following the occurrence of an error or warning condition is the result of manual action by the collator operator. However, while this mode of operation is preferred, it is within the scope of the invention stop the collator automatically under control of the computer 182 following the occurrence of either type of condition. Ordinarily, only an error condition (i.e., the detection of a form 22 with mismatched plies) will be regarded as sufficient reason to stop the collator, since a warning condition caused by an inability to read one or more indicia on the plies may be temporary and may disappear spontaneously. If desired, therefore, the computer 182 may be programmed to stop the collator in response to the occurrence of an error condition (or a predetermined minimum number of successive error conditions) at a given one of the stations 84–92 and 104.

Figure 13A:
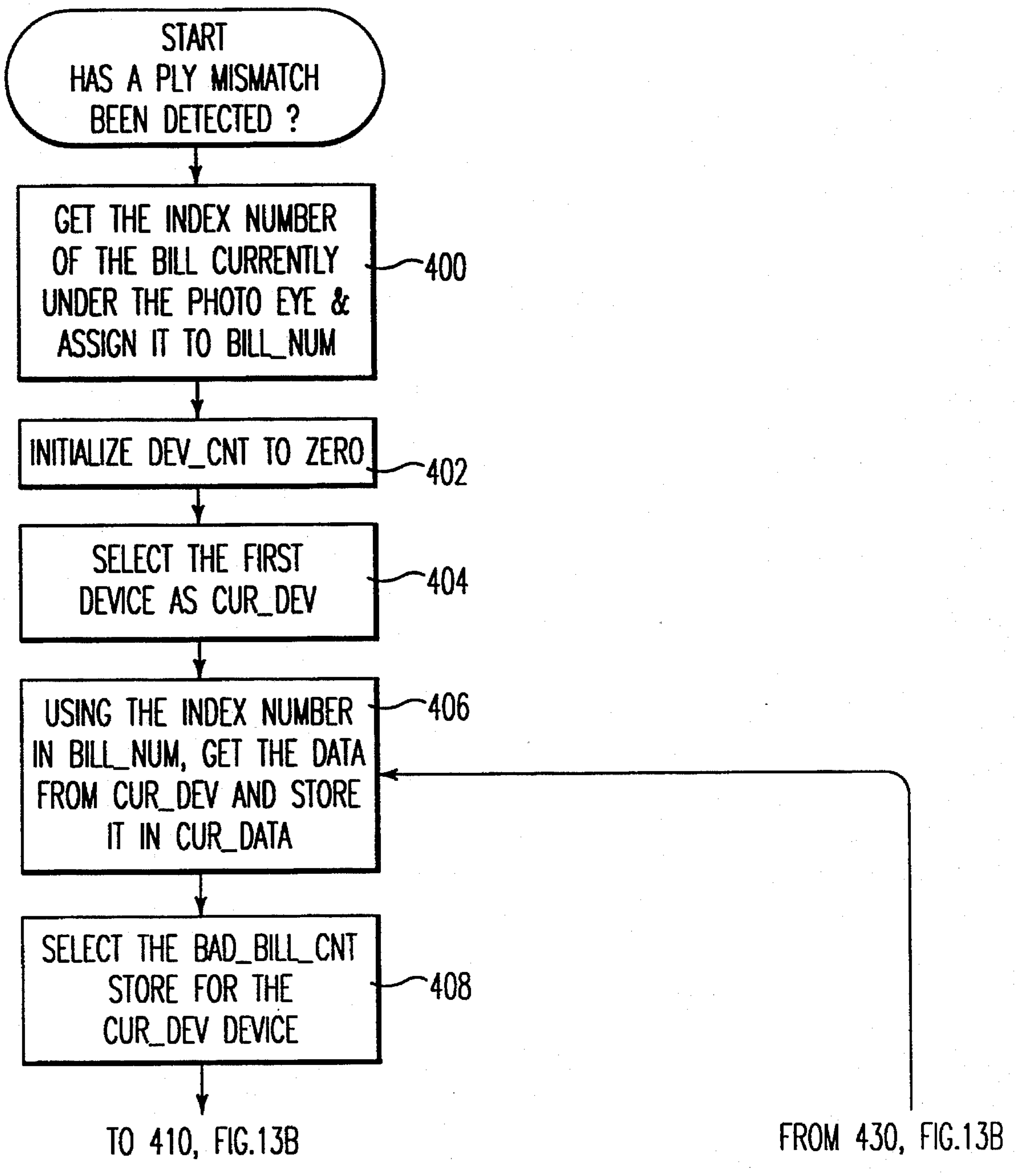
Figure 13B:
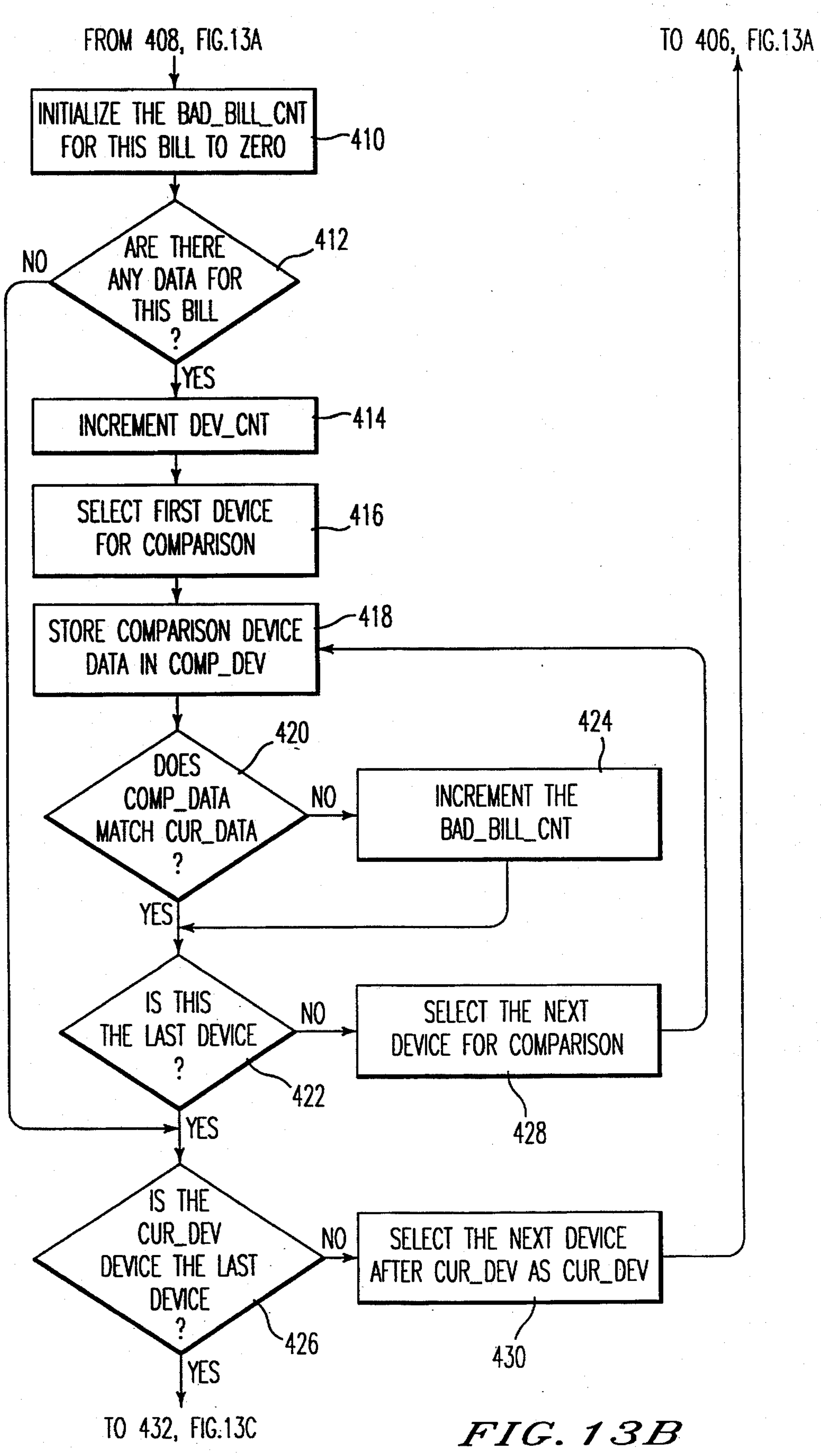
Figure 13C:
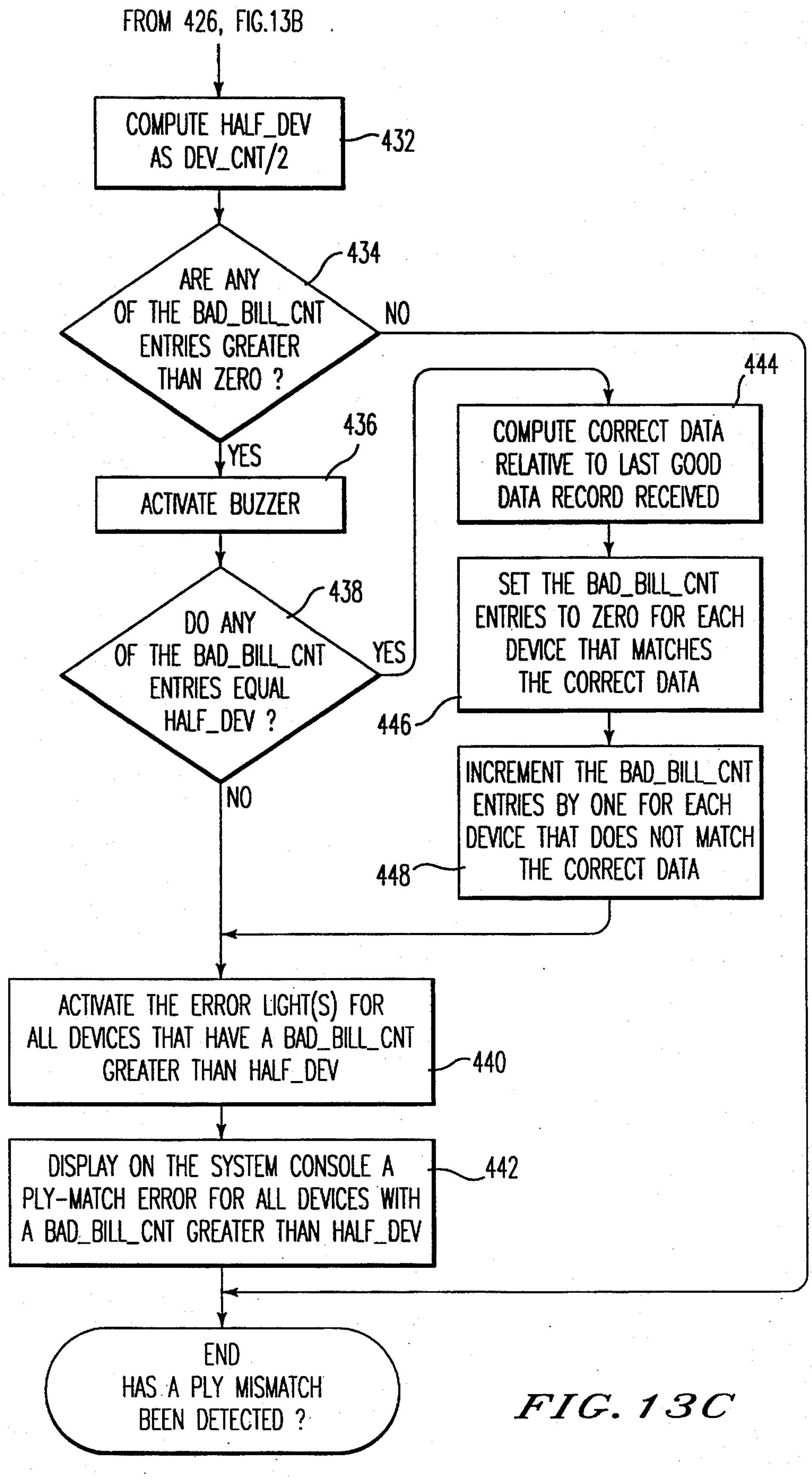

FIG. 13 is a flow chart illustrating the manner in which the computer 182 determines whether a ply matching error has been detected in blocks 356–360 of FIG. 11. In block 400, the computer determines the index number of the form 22 whose registration mark 58 has just been detected by the photoelectric detector 148 in block 354 of FIG. 11. This index number, which will correspond to the contents of the FIFO buffer location designated by the global pointer P1 in FIG. 12, is used to define the initial value of a parameter referred to as BILL_NUM. In block 402, the computer 182 initializes a parameter DEV_CNT to zero. The computer 182 then proceeds to block 404, where a parameter CUR_DEV is set to a value corresponding to the first device (i.e., the first bar code scanner or video camera) whose output is to be processed. In block 406, the computer 182 uses the index number BILL_NUM to obtain the output data from the first device by adding the value of BILL_NUM to the first FIFO buffer address for the device in question and reading the output data stored at the FIFO buffer location. This data is stored at a memory location referred to as CUR_DATA. In block 408, a memory location designated BAD_BILL_CNT corresponding to the first device is accessed. A separate BAD_BILL_CNT storage location is reserved for each bar code scanner or video camera used in the system. In block 410, the value of BAD_BILL_CNT for the first device is initialized to zero.

Following the operations described above, the computer proceeds to decision block 412 of FIG. 13 and determines whether any data has been read from the FIFO buffer accessed in block 406. If so, the computer 182 proceeds to block 414 and increments the parameter DEV_CNT. In block 416, the computer 182 selects the first device for comparison with the data read in block 406. In the preferred embodiment of the invention, this is the same as the device selected in block 404; in other words, the data from the first device will be compared with itself during the first pass through the program loop. In block 418, the output data from the device to be compared is obtained from the appropriate FIFO buffer of FIG. 12 using a procedure similar to that described above in connection with block 406. The resulting data is stored in a memory location referred to as COMP_DEV. In decision block 420, the computer 182 determines whether the values in the storage locations CUR_DATA and COMP_DATA match. If they do, the computer proceeds to a further decision block 422; if not, the computer increments the value of BAD_BILL_CNT in block 424 before proceeding to the decision block 422. In decision block 422, the computer determines whether the FIFO buffer data for the first device has been compared with the FIFO buffer data for each of the remaining devices. If so, the comparison operation for the first device is complete and the computer proceeds to a further decision block 426. If not, the computer proceeds to block 428 and selects the next device for comparison. The program loop comprising blocks 418, 420, 422, 424 and 428 will then be repeated until the output data for the first device has been compared with the output data for all of the remaining devices. When this condition is satisfied, the computer proceeds to decision block 426 as described previously. Thus, assuming for example that the first device selected is the video camera 120, the decision block 426 will be reached after the computer 182 has compared the output data from the video camera with the output data from each of the bar code scanners 110–118. If any of these comparisons do not result in a match, the value of BAD_BILL_CNT for the video camera 120 will have been incremented accordingly. As illustrated in FIG. 13, the computer 182 proceeds directly to decision block 426 from decision block 412 in the event that no data was found in the FIFO buffer for the device in question.

In decision block 426, the computer determines whether the device for which all of the preceding comparisons have been made (i.e., the video camera 120 in the example) is the last device in the system. If not, the computer proceeds to block 430 and sets the parameter CUR_DEV equal to a value that corresponds to the next device. Thus, assuming that the video camera 120 was the first device, the bar code scanner 110 may be selected as the next device in block 430. The computer then returns to block 406, and uses the index number BILL_NUM to obtain the FIFO buffer data for the bar code scanner 110. The computer 182 then carries out the operations in blocks 408–416 and reenters the program loop that begins in block 418. In this program loop, the output data from the bar code scanner 110 is taken as the reference data and is compared with the output data from the video camera 120 and bar code scanners 112–118. Depending upon the results of these comparisons, a value of BAD_BILL_CNT is computed for the bar code scanner 110. When this procedure is complete, the computer returns again to decision blocks 426 and 430, and repeats the process for the remaining bar code scanners 112–118. At that point, all of the required comparisons have been made and value of BAD_BILL_CNT exists for each of the devices 110–118 and 120.

In block 432 of FIG. 13, the computer 118 calculates a parameter HALF_DEV which is equal to one-half of the parameter DEV_CNT rounded down to the nearest integer. In the illustrated system employing one video camera 120 and five bar code scanners 110–118, HALF_DEV will be equal to three. In decision block 434, the computer checks to determine whether the value of BAD_BILL_CNT is greater than zero for any of the devices 110–118 or 120. If not, there are no matching errors and the program routine is complete. However, if at least one of the stored values of BAD_BILL_CNT is greater than zero, the computer 182 proceeds to block 436 and activates the warning buzzer 194 of FIG. 7. The computer 182 then proceeds to decision block 438 and determines whether any of the stored values of BAD_BILL_CNT are equal to HALF_DEV. This is done in order to determine whether the number of matching and non-matching plies are equal, a situation which makes it impossible to determine which plies (and collator stations) are in error. If this condition is found not to exist, the computer proceeds to block 440 and activates the red error lamp 134 at each of the collator stations 84–92 and 104 for which the corresponding bar code scanners 110–118 and video camera 120 have a BAD_BILL_CNT that is greater than HALF_DEV. This latter requirement is imposed because a device 110–118 or 120 that detects valid data on a form ply will nevertheless have a nonzero value of BAD_BILL_CNT if its data has been compared with data from another device where an error has in fact occurred. By requiring the value of BAD_BILL_CNT to be greater than HALF_DEV in block 440, this contribution to the value of BAD_BILL_CNT for a particular device is eliminated. In block 442, the computer displays an error indication on the video display terminals 186 and 190 of FIG. 7 for all devices with a BAD_BILL_CNT greater than HALF_DEV. This supplements the information provided by the illumination of the red warning lamps 134, and allows the collator operator to quickly identify the collator stations where corrections need to be made.

If the computer 182 determines in decision block 438 that the value of BAD_BILL_CNT for any of the devices 110–118 or 120 is equal to HALF_DEV, a deadlock situation exists in that the number of matching plies is equal to the number of non-matching plies. In that event, the computer proceeds to block 444 and checks the stored data (i.e., tracking number) for the last form 222 that did not contain any matching errors. From this data, the computer can infer which of the current plies are in error and which are correct. In block 446, the computer 182 sets the value of BAD_BILL_CNT to zero for each of the devices whose data-the computer has found to be correct. In block 448, the computer increments the value of BAD_BILL_CNT by one for each device whose data the computer has determined not to be correct. With these reset values of BAD_BILL_CNT, the computer proceeds to block 440 and activates the red error lamps 134 at the collator stations where the errors are determined to have occurred. After displaying any errors on the video display terminals 186 and 190 in block 442, the matching routine in complete.

Figure 14:
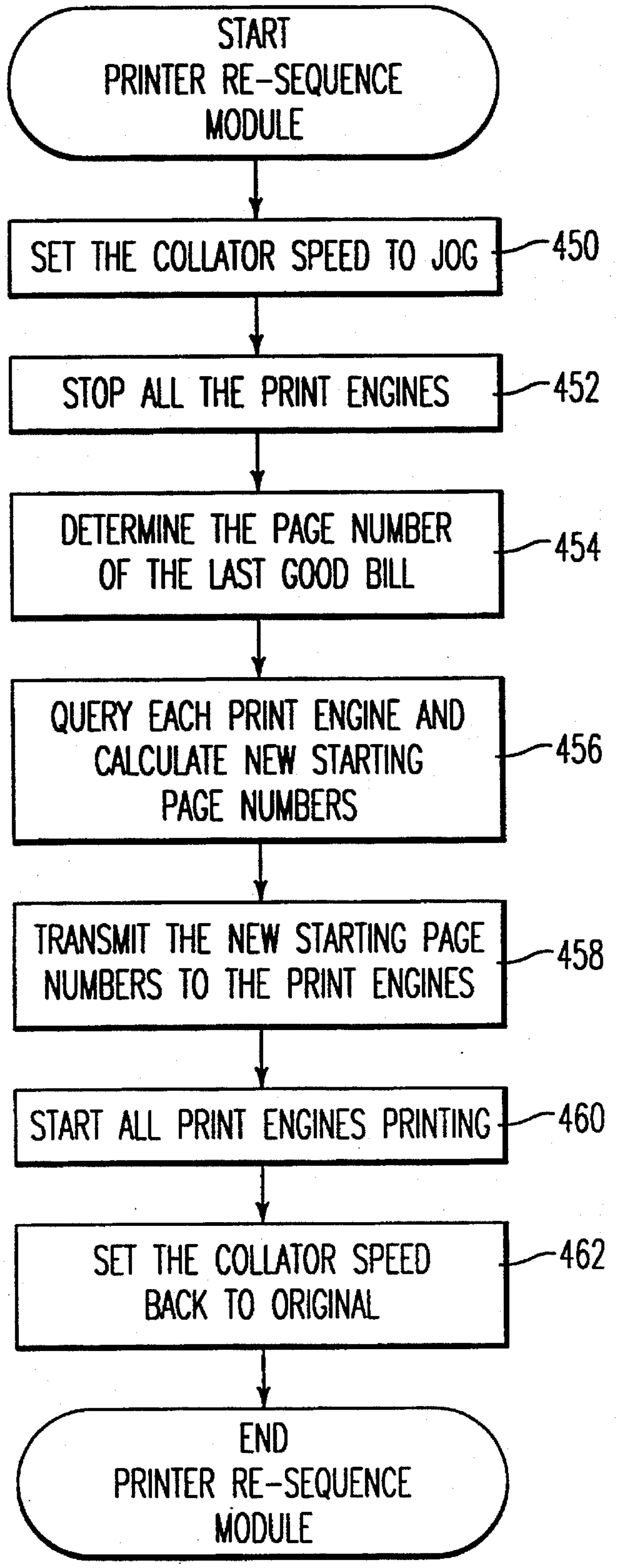
FIG. 14 is a flow chart illustrating the manner in which the computer shown in FIG. 7 may be programmed to carry out automatic resequencing of the print engines used in the printing and collating system, in the event of a verification or matching error.

FIG. 14 is a flow chart which illustrates the manner in which the computer 182 can automatically resequence the print engines 72–80 of FIG. 2 after a matching error occurs, as indicated by block 394 in FIG. 11. Following the detection of an error condition, the computer proceeds to block 450 of FIG. 14 and changes the operating mode of the collator 82 from RUN to JOG. The reduced speed of the collator 82 in the JOG mode reduces product waste during the printer resequencing operation, that keeps the collator in operation so that adhesive drying and other problems arising from stoppage of the collator do not occur. In block 452, operation of the print engines 72–80 is stopped to prevent any further variable information from being printed on the individual webs or plies 24–32. In block 454, the computer 182 checks its memory to determine the page number of the last correctly printed form 22. The page numbers used by the print engines 72–80 correspond to the individual forms 22, with each page being defined by the presence of a registration mark on the particular ply or web 24–32. The computer then proceeds to block 456 and queries each of the print engines 72–80 to determine its current page number, and calculates new starting page numbers for each of the print engines. In block 458, the new starting page numbers are transmitted to the respective print engines 72–80. Once the new starting page numbers have been transmitted, the computer restarts the print engines in block 460, and returns the collator to the RUN mode in block 462. At this point, the printer resequencing operation is complete.

Figure 15:
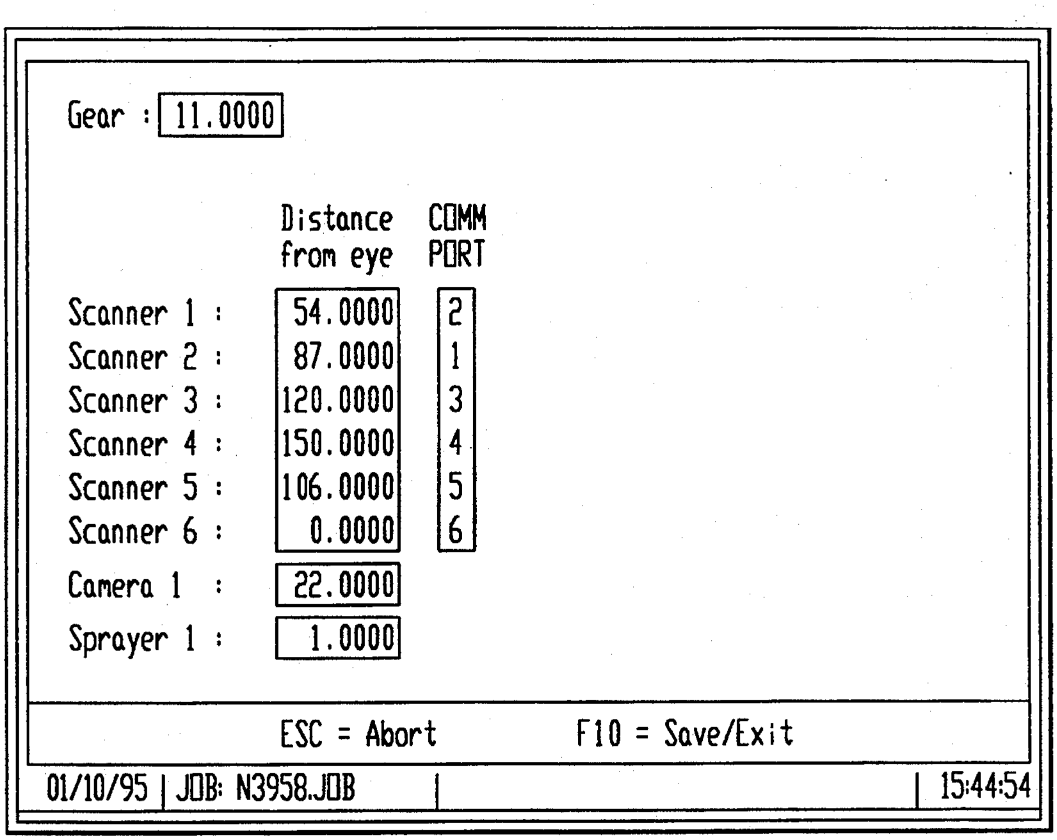
FIGS. 15–17 illustrate exemplary display screens which are produced by the computer to assist an operator in setting up and monitoring the automatic verification or matching system.
Figure 16:
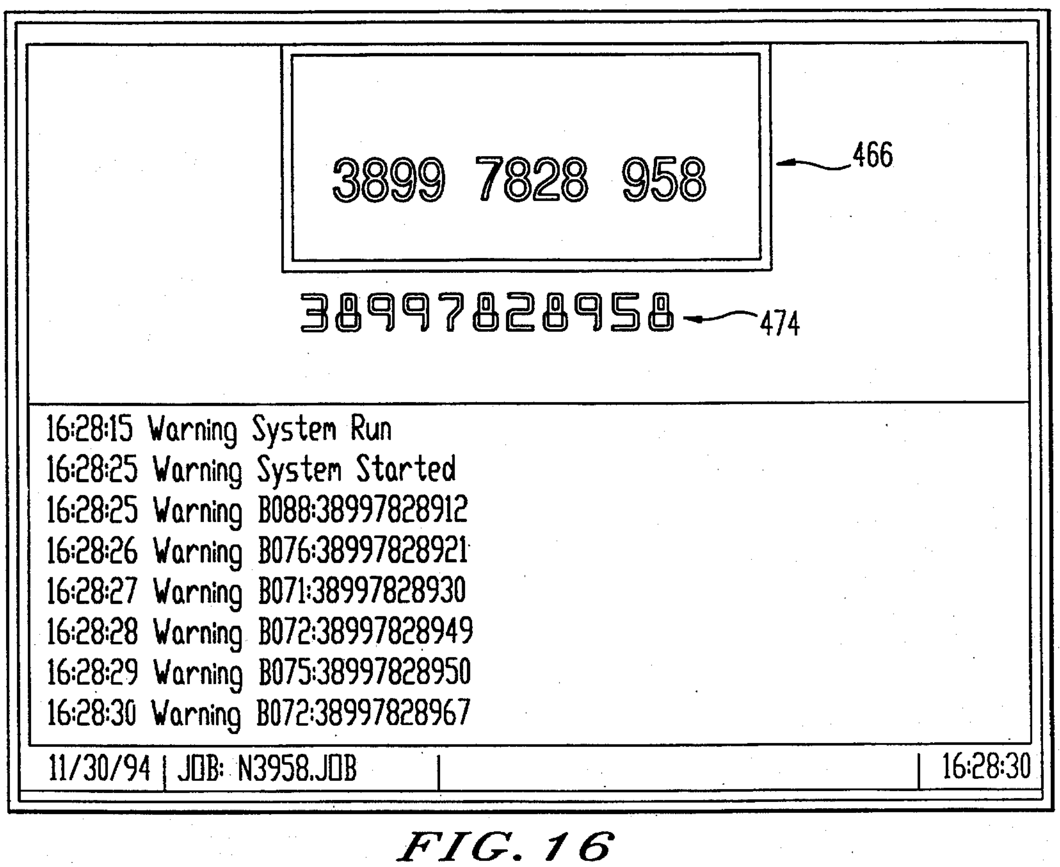
Figure 17:
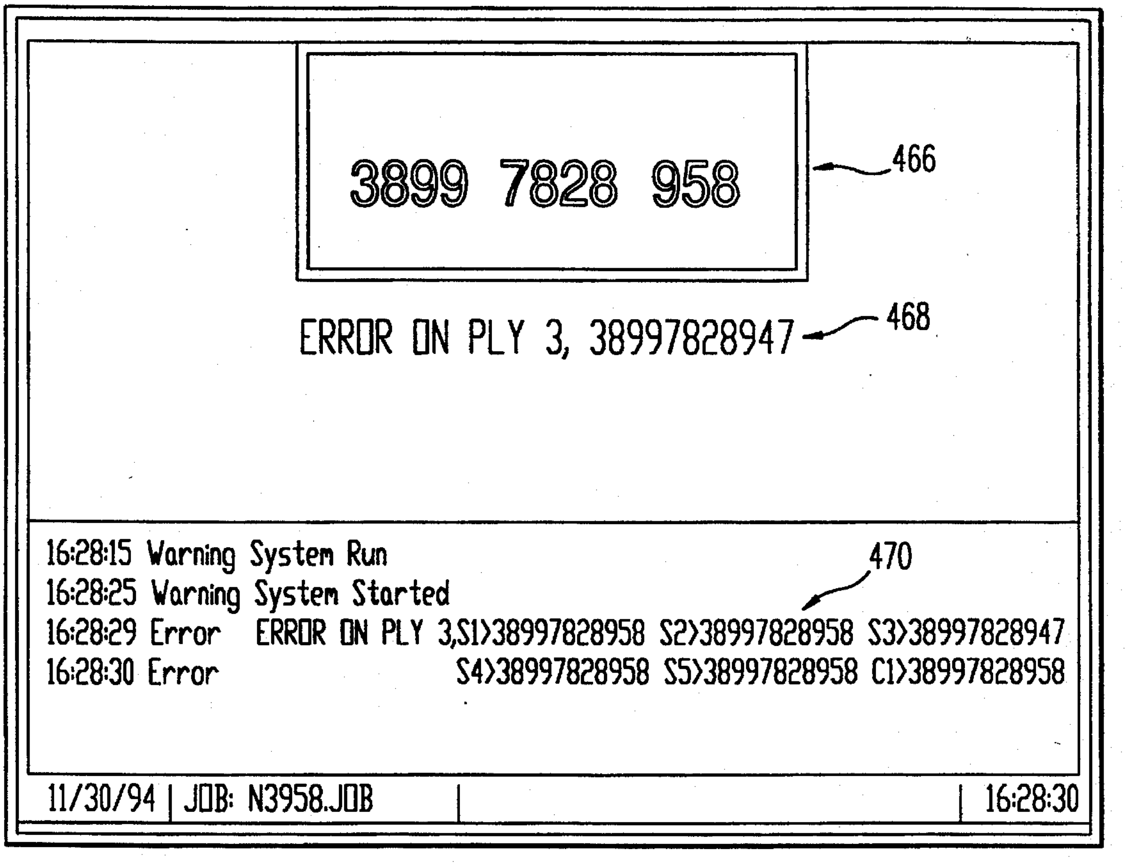

FIGS. 15–17 illustrate three representative display screens which are displayed by the computer 182 on the video display terminals 186 and 190 of FIG. 7. FIG. 15 illustrates a set-up screen which is used by the operator to configure the system for the desired number and location of bar code scanners and video cameras. The values shown under the column heading "Distance from Eye" represent the measured distance (in inches) along the collator 82 between the photoelectric detector 148 and each of the bar code scanners 110–118, the video camera 120, and the sprayer unit 150. A zero value has been specified for scanner 6 to indicate that only five bar code scanners 110–118 are present, as in the exemplary system illustrated in FIGS. 2 and 3. Similar zero entries (not shown) may be provided for the unused video cameras 214 and 216 of FIG. 7. The heading "COMM PORT" refers to input/output port assignments within the computer 182 for each of the bar code scanner control units 202–211 of FIG. 7. The value filled in next to the term "Gear" represents the amount of linear travel (in inches) of the collator pin bands 100 and 102 for each full turn of the collator shaft 142. Once all of these values are specified by the operator during initial set-up, the computer 182 has sufficient information to carry out the desired verification or matching operation.

FIG. 16 illustrates a run screen which is displayed to the operator while the collator 82 is in operation. The run screen displays the stored outputs, for a given one of the forms 22, from the bar code scanners and video cameras for which the system has been configured. In the illustration shown, the outputs from the bar code scanners 110–118 and video camera 120 (which are all the same in the absence of an error) are displayed as a single set of digit 464 representing the sensed bar codes 36 and label digits 44. Also displayed is a small window 466 representing a portion of the field of view of the video camera 120. The size and location of the window is established by the operator during initial system set-up. As noted previously, the data displayed to the operator is preferably updated at some fraction of the actual rate of form movement along the collator 82, since the display would otherwise change too quickly to be of any use to the operator. In addition to the scanner and camera outputs, the display shown in FIG. 14 also includes a history of recent warning conditions at the bottom of the screen. If error conditions or collator stoppages occur, these are displayed in a similar manner.

FIG. 17 illustrates an error screen which is displayed by the computer 182 wherever an error condition occurs that results in the illumination of one or more of the red warning lamps 134. The matching digits 464 on the run screen of FIG. 14 are replaced with an error message 468 which indicates the particular ply (i.e., collator station) that is in error, together with the erroneous tracking number detected on that ply. At the bottom of the display, the computer 182 prints a more detailed error message 470 which lists the tracking numbers detected on all of the plies by the bar code scanners 110–118 and video camera 120. In the example shown, four of the five bar code scanners (S1, S2, S4 and S5) and the video camera (C1) have detected matching plies, and one bar code scanner (S3) has detected a non-matching ply. In cases where more than one ply is in error, the display will include an error message 468 for each erroneous ply.

In addition to the display screens shown in FIGS. 15–17, the computer 182 may be programmed to generate other display screens or menus for various functions. These may include display screens for establishing the operating parameters of the bar code scanners, display screens for setting the video camera image window that is to be processed by the computer 182, display screens for setting communication parameters between the computer 182 and various external devices of FIG. 7, and display screens for certain diagnostic and housekeeping operations. These display screens will depend to some extent on the specific components used in the system, and have been omitted for simplicity.

Although the present invention has been described with reference to certain preferred embodiments, it will be understood that the invention is not limited to the details thereof. Various modifications and substitutions have been suggested in the foregoing description, and others will occur to those of ordinary skill in the art. All such modifications and substitutions are intended to fall within the scope of the invention as defined in the appended claims.

What is claimed is:

1. An automatic verification system for use on a collator having a plurality of stations for assembling a multiple-part printed product and a continuously moving transport system for successively advancing the parts of said product through said stations, said verification system comprising:

a plurality of indicia sensing devices associated with said plurality of stations, each of said indicia sensing devices being located at a different one of said stations for sensing indicia on a different part of said product and producing an output representing said indicia;

a reference position sensor for sensing the arrival of a product or part thereof at a reference position on said collator and for producing an output in response to the arrival of said product or part thereof at said position;

a motion sensor connected to said reference position sensor for sensing the movement of said transport system and for producing outputs when said product or part thereof has advanced by predetermined distances from said reference position; and a control device connected to said plurality of indicia sensing devices, said reference position sensor and said motion sensor, said control device being operable to cause said indicia sensing devices to sense said indicia in response to outputs from said motion sensor, to store the outputs from said indicia sensing devices until the indicia for all parts of an assembled product have been sensed, and to compare said indicia to determine whether said product has been properly assembled.

2. An automatic verification system as claimed in claim 1, wherein at least one of said indicia sensing devices comprises a bar code scanner, and wherein said motion sensor comprises:

a resolver coupled to a drive shaft of said collator for sensing the angular position of said shaft; and a programmable limit switch connected to said resolver for producing said motion sensor outputs.

3. An automatic verification system as claimed in claim 1, wherein at least one of said indicia sensing devices comprises a video camera, and wherein said motion sensor comprises:

an encoder coupled to a drive shaft of said collator for sensing rotation of said shaft; and a programmable counter connected to said encoder for producing said motion sensor outputs.

4. An automatic verification system as claimed in claim 1, wherein said product comprises one of a series of connected multiple-ply forms, wherein said collator assembles said forms by overlaying a plurality of continuous webs onto each other, with each succeeding web being introduced to said collator at a corresponding one of said stations and overlaid on a web introduced at a previous station, and further wherein each of said indica sensing devices is positioned to sense indicia on the web introduced at the corresponding station before said web is overlaid by a web introduced at a succeeding station.

5. An automatic verification system as claimed in claim 1, wherein said reference position sensor comprises a photoelectric detector.

6. An automatic verification system for use on a collator having a plurality of stations for assembling a multiple-part printed product and a transport system for advancing the parts of said product through said stations, said verification system comprising:

a plurality of indicia sensing devices associated with said stations for sensing indicia on the parts of said product and producing outputs representing said indicia, said indicia sensing devices including first and second indicia sensing devices of different types; and a control device connected to said plurality of indicia sensing devices, said control device being operable to cause said indicia sensing devices to sense said indicia, to store the outputs from said indicia sensing devices until the indicia for all parts of an assembled product have been sensed, and to compare said indicia to determine whether said product has been properly assembled, said control device producing a first output signal for controlling said first indicia sensing device and a second output signal different from said first output signal for controlling said second indicia sensing device.

7. An automatic verification system as claimed in claim 6, wherein said first indicia sensing device comprises a laser bar code scanner and said second indicia sensing device comprises a video camera.

8. An automatic verification system as claimed in claim 7, further comprising motion sensing means coupled to said control device for sensing the motion of said transport system, and wherein:

said first output signal produced by said control device has a variable duration determined by the rate of motion of said transport system and the length of the indicia to be sensed in the direction of transport motion; and said second output signal produced by said control device has a fixed duration sufficient to trigger said video camera.

9. An automatic verification system as claimed in claim 8, further comprising a reference position sensor coupled to at least one of said control device and said motion sensing means for sensing the arrival of a product or part thereof at a reference position on said collator, and wherein:

said first output signal produced by said control device has a start time determined by the approximate arrival of the leading edge of the indicia to be sensed within the scan field of said bar code scanner as determined by said motion sensing means and said reference position sensor; and said second output signal produced by said control device has a start time determined by the approximate arrival of the indicia to be sensed within the image frame of said video camera as determined by said motion sensing means and said reference position sensor.

10. An automatic verification system as claimed in claims 7, wherein said bar code scanner and said video camera are located at different ones of said stations for sensing indicia on different parts of said product.

11. An automatic verification system as claimed in claim 7, wherein said bar code scanner and said video camera are located at the same one of said stations for sensing indicia at different locations on the same part of said product.

12. An automatic verification system for use with a product printing and collating system of the type which includes a plurality of printing devices for printing variable indicia on different parts of a multiple-part printed product, and a collator having a corresponding plurality of stations for receiving the printed parts of said multiple-part printed product from said printing devices at different times and assembling said parts into said multiple-part printed product and a transport system for successively advancing the parts of said product through said stations, said verification system comprising:

a plurality of indicia sensing devices associated with said plurality of stations, each of said indicia sensing devices being located at a different one of said stations for sensing indicia on a different part of said product and producing an output representing said indicia; and a control device connected to said plurality of indicia sensing devices and to said plurality of printing devices, said control device being operable to cause said indicia sensing devices to sense said indicia, to store the outputs from said indicia sensing devices until the indicia for all parts of an assembled product have been sensed, to compare said indicia to determine whether said product has been properly assembled, and to modify the operation of at least one of said printing devices in the event that said product has not been properly assembled.

13. An automatic verification system as claimed in claim 12, wherein each of said printing devices is adapted to print a predetermined sequence of indicia on product parts delivered to the corresponding one of said stations, and wherein said control device is operable to modify said sequence for at least one of said printing devices in the event that a product has not been properly assembled.

14. An automatic verification system as claimed in claim 13, wherein the predetermined sequences of indicia printed by said printing devices are offset from each other so that all parts of a product will have corresponding indicia after assembly by said collator, and further wherein said control device is operable to modify the amount of said offset for at least one of said printing devices in the event that said product has not been properly assembled.

15. An automatic verification system for use on a collator having a plurality of stations for assembling a multiple-part printed product and a transport system for advancing the parts of said product through said stations, said verification system comprising:

a plurality of indicia sensing devices associated with said plurality of stations, each of said indicia sensing devices being located at a different one of said stations for sensing indicia on a different part of said product and producing an output representing said indicia;

a control device connected to said plurality of indicia sensing devices, said control device being operable to cause said indicia sensing devices to sense said indicia, to store the outputs from said indicia sensing devices until the indicia for all parts of an assembled product have been sensed, and to compare said indicia to determine whether said product has been properly assembled; and a first plurality of visual indicators connected to said control device, each of said visual indicators of said first plurality being located at a corresponding one of said stations for indicating a first error condition occurring at said station.

16. An automatic verification system as claimed in claim 15, wherein said first error condition comprises the failure of the indicia sensed on a part of a multiple-part product by an indicia sensing device located at said station to satisfy a predetermined relationship with the indicia sensed on another part of said multiple-part product by an indicia sensing device located at a different station.

17. An automatic verification system as claimed in claim 16, wherein said predetermined relationship comprises identity between at least a portion of said respective indicia.

18. An automatic verification system as claimed in claim 16, wherein said first error condition comprises the failure of the indicia sensed on a part of a multiple-part product by an indicia sensing device located at said station to satisfy a predetermined relationship with the indicia previously sensed by said indicia sensing device on a part of another multiple-part product.

19. An automatic verification system as claimed in claim 15, wherein said first error condition comprises the inability of an indicia sensing device located at said station to sense indicia on a part of a multiple-part product within a predetermined margin of error.

20. An automatic verification system as claimed in claim 15, further comprising a second plurality of visual indicators connected to said control device, each of said visual indicators of said second plurality being located at a corresponding one of said stations for indicating a second error condition occurring at said station, said second error condition being different from said first error condition.

21. An automatic verification system as disclosed in claim 20, wherein:

said first error condition comprises the failure of the indicia sensed on a part of a multiple-part product by an indicia sensing device located at said station to satisfy a predetermined relationship with the indicia sensed on another part of said multiple-part product by an indicia sensing device located at a different station; and said second error condition comprises the inability of an indicia sensing device located at said station to sense the indicia on a part of a multiple-part product within a predetermined margin of error.

22. An automatic verification system for use on a collator having a plurality of stations for assembling a multiple-part printed product and a transport system for advancing the parts of said product through said stations, said verification system comprising:

a plurality of indicia sensing devices associated with said plurality of stations, each of said indicia sensing devices being located at a different one of said stations for sensing indicia on a different part of said product and producing an output representing said indicia;

a control device connected to said plurality of indicia sensing devices, said control device being operable to cause said indicia sensing devices to sense said indicia, to store the outputs from said indicia sensing devices until the indicia for all parts of an assembled product have been sensed, to compare said indicia to determine whether said product has been properly assembled, and to produce an output signal in the event that a product has not been properly assembled; and a dye marker mounted at an output end of said collator for marking a product which has been improperly assembled, said dye marker being activated by said output signal from said control device.

23. An automatic verification system as claimed in claim 21, wherein said collator is adapted to assemble a continuous series of multiple-part products, and wherein said output signal causes said dye marker to mark all of the assembled products in said continuous series following the detection of an improperly assembled product until said control device is reset.

24. A method for verifying proper assembly of a multiple-part printed product, comprising the steps of:

successively advancing the parts of said product through a plurality of assembly stations;

sensing the arrival of said product or of a part thereof at a reference position with respect to said plurality of assembly stations;

sensing the advance of said product or part thereof by predetermined distances from said reference position;

upon sensing the advance of said product or part thereof by each of said predetermined distances, sensing indicia on a part of said product at one of said assembly stations; and after the indicia for all parts of an assembled product have been sensed, comparing said sensed indicia to determine whether said product has been properly assembled.

25. A method as claimed in claim 24, wherein the step of sensing the arrival of said product or part thereof at said reference position is carried out by sensing a mark on said product or part thereof.

26. A method as claimed in claim 24, wherein the parts of said product are advanced through said assembly stations by a transport system, and wherein the step of sensing the advance of said product or part thereof by said predetermined distances comprises counting pulses from a motion sensing device coupled to said transport system.

27. A method as claimed in claim 24, wherein the step of sensing indicia on the parts of said product at said assembly stations comprises triggering automatic indicia sensing devices located at said assembly stations.

28. A method as claimed in claim 24, wherein said product comprises one of a series of connected multiple-ply forms assembled by overlaying a plurality of continuous webs onto each other, with each succeeding web being introduced at a corresponding one of said assembly stations and overlaid on a web introduced at a previous assembly station, and wherein each of said indicia sensing devices is positioned to sense indicia on a web introduced at the corresponding assembly station before said web is overlaid by a web introduced at a succeeding assembly station.

29. A method for verifying proper assembly of a multiple-part printed product, comprising the steps of:

advancing the parts of said product through a plurality of assembly stations;

providing indicia sensing devices at said assembly stations for sensing indicia on the parts of said product, said indicia sensing devices including first and second indicia sensing devices of different types;

producing control signals for causing said indicia sensing devices to sense said indicia, said control signals including a first control signal for controlling said first indicia sensing device and a second control signal different from said first control signal for controlling said second indicia sensing device; and comparing the indicia sensed by said indicia sensing devices to determine whether said product has been properly assembled.

30. A method as claimed in claim 29, wherein said first indicia sensing device comprises a laser bar code scanner, said second indicia sensing device comprises a video camera, and the parts of said product are advanced through said assembly stations by a transport system, and further wherein:

said first control signal has a variable duration determined by the rate of motion of said transport system and the length of the indicia to be sensed in the direction of transport motion; and said second control signal has a fixed duration sufficient to trigger said video camera.

31. A method as claimed in claim 30, wherein:

said first control signal has a start time determined by the approximate arrival of the leading edge of the indicia to be sensed within the scan field of said bar code scanner; and said second control signal has a start time determined by the approximate arrival of the indicia to be sensed within the image frame of said video camera.

32. A method as claimed in claim 29, wherein said first and second indicia sensing devices are located at different ones of said assembly stations for sensing indicia on different parts of said product.

33. A method as claimed in claim 29, wherein said first and second indicia sensing devices are located at the same one of said assembly stations for sensing indicia at different locations on the same part of said product.

34. A method for printing and assembling a multiple-part printed product, comprising the steps of:

operating a plurality of printing devices to print variable indicia on different parts of a multiple-part printed product prior to assembly;

assembling said parts to create said multiple-part printed product, said assembly step being carried out by successively feeding said parts to different assembly stations at different times;

sensing said variable indicia on the parts of said product during assembly thereof;

storing said sensed indicia until the indicia for all parts of an assembled product have been sensed;

comparing said sensed indicia to determine whether said product has been properly assembled; and automatically modifying the operation of at least one of said printing devices in the event that said product has not been properly assembled.

35. A method as claimed in claim 34, wherein each of said printing devices is adapted to print a predetermined sequence of indicia on parts of successive multiple-part printed products, and wherein the step of automatically modifying the operation of at least one of said printing devices comprises the step of modifying said sequence for said one printing device in the event that a product has not been properly assembled.

36. A method as claimed in claim 35, wherein said predetermined sequences of indicia printed by said printing devices are offset from each other so that all parts of a product will have corresponding indicia after assembly, and further wherein the step of modifying said sequence for said at least one printing device comprises modifying the amount of said offset in the event that said product has not been properly assembled.

37. A method for verifying proper assembly of a multiple-part printed product, comprising the steps of:

advancing the parts of said product through a plurality of assembly stations;

operating indicia sensing devices at said assembly stations for sensing indicia on the parts of said product;

comparing the indicia sensed by said indicia sensing devices to determine whether said product has been properly assembled; and in the event that said product has not been properly assembled, illuminating a visual indicator at each assembly station where an assembly error has occurred.

38. A method as claimed in claim 37, wherein said assembly error comprises the failure of the indicia sensed on a part of a multiple-part product by an indicia sensing device located at said station to satisfy a predetermined relationship with the indicia sensed on another part of said multiple-part product by an indicia sensing device located at a different station.

39. A method as claimed in claim 38, wherein said predetermined relationship comprises identity between at least a portion of said respective indicia.

40. A method as claimed in claim 37, wherein said assembly error comprises the failure of the indicia sensed on a part of a multiple-part product by an indicia sensing device located at said station to satisfy a predetermined relationship with the indicia previously sensed by said indicia sensing device on a part of another multiple-part product.

41. A method as claimed in claim 37, wherein said assembly error comprises the inability of an indicia sensing device located at said station to sense indicia on a part of a multiple-part product within a predetermined margin of error.

42. A method as claimed in claim 37, comprising the further step of illuminating a second visual indicator at each assembly station where a second assembly error has occurred, said second assembly error being different from said first-mentioned assembly error.

43. A method as claimed in claim 42, wherein:

said first-mentioned assembly error comprises the failure of the indicia sensed on a part of a multiple-part product by an indicia sensing device located at said station to satisfy a predetermined relationship with the indicia sensed on another part of said multiple-part product by an indicia sensing device located at a different station; and said second assembly error comprises the inability of an indicia sensing device located at said station to sense the indicia on a part of a multiple-part product within a predetermined margin of error.

44. A method for verifying proper assembly of a multiple-part printed product, comprising the steps of:

advancing the parts of said product through a plurality of assembly stations;

operating indicia sensing devices at said assembly stations for sensing indicia on the parts of said product;

comparing the indicia sensed by said indicia sensing devices to determine whether said product has been properly assembled; and in the event that said product has not been properly assembled, automatically marking said product with a visible mark to indicate that said product is defective.

45. A method as claimed in claim 44, wherein said advancing, operating and comparing steps are repeated for assembling a continuous series of multiple-part products, and wherein said marking step is carried out on all of the assembled products in said continuous series following the detection of an improperly assembled product.

* * * * *